United States Patent
Gong et al.

(10) Patent No.: US 12,016,058 B2
(45) Date of Patent: Jun. 18, 2024

(54) SEQUENCE DETECTION METHOD AND DEVICE

(71) Applicant: HUAWEI TECHNOLOGIES CO., LTD., Guangdong (CN)

(72) Inventors: Mingxin Gong, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 17/831,683

(22) Filed: Jun. 3, 2022

(65) Prior Publication Data

US 2022/0312503 A1   Sep. 29, 2022

Related U.S. Application Data

(63) Continuation of application No. PCT/CN2019/123104, filed on Dec. 4, 2019.

(51) Int. Cl.
*H04W 74/08* (2024.01)
*H04J 13/00* (2011.01)
(Continued)

(52) U.S. Cl.
CPC ..... *H04W 74/0841* (2013.01); *H04J 13/0062* (2013.01); *H04L 27/2607* (2013.01);
(Continued)

(58) Field of Classification Search
CPC ......... H04W 74/0841; H04W 72/0446; H04W 72/0453; H04W 74/0866; H04J 13/0062;
(Continued)

(56) References Cited

U.S. PATENT DOCUMENTS

| 10,270,577 B2 * | 4/2019 | Guan ................... H04L 27/2666 |
| 2009/0147757 A1 * | 6/2009 | Naka ..................... H04W 88/02 |
| | | 375/267 |

(Continued)

FOREIGN PATENT DOCUMENTS

| CA | 3072681 A1 * | 2/2019 | ........... H04L 27/261 |
| CN | 101295999 A | 10/2008 | |

(Continued)

OTHER PUBLICATIONS

Extended European Search Report issued in European Application No. 19954950.2 on Oct. 13, 2022, 10 pages.

(Continued)

*Primary Examiner* — Mounir Moutaouakil
(74) *Attorney, Agent, or Firm* — Fish & Richardson P.C.

(57) ABSTRACT

This application relates to a sequence detection method and a device. One example method includes receiving a first sequence carried on a plurality of subcarriers; differentiating the first sequence based on L granularities, to obtain a first differential sequence set comprising L sequences; determining K candidate frequency domain root sequences in the U candidate frequency domain root sequences based on differential sequence cross correlation value sets corresponding to the U candidate frequency domain root sequences; and determining a candidate frequency domain root sequence and a time domain cyclic shift value that correspond to the first sequence, based on the first sequence and the K candidate frequency domain root sequences.

18 Claims, 7 Drawing Sheets

(51) Int. Cl.
*H04L 27/26* (2006.01)
*H04W 72/0446* (2023.01)
*H04W 72/0453* (2023.01)
*H04W 74/0833* (2024.01)

(52) U.S. Cl.
CPC ... *H04W 72/0446* (2013.01); *H04W 72/0453* (2013.01); *H04W 74/0866* (2013.01)

(58) Field of Classification Search
CPC ............. H04L 27/2607; H04L 27/2675; H04L 27/2684; H04L 27/2663; H04L 27/2666
See application file for complete search history.

(56) References Cited

U.S. PATENT DOCUMENTS

| | | | |
|---|---|---|---|
| 2015/0003421 | A9 | 1/2015 | Kwon et al. |
| 2015/0326356 | A1* | 11/2015 | Guan .................. H04W 52/54 370/330 |

FOREIGN PATENT DOCUMENTS

| | | | | | |
|---|---|---|---|---|---|
| CN | 101355383 | A | | 1/2009 | |
| CN | 101977170 | A | | 2/2011 | |
| CN | 103079227 | A | | 5/2013 | |
| CN | 104918336 | A | | 9/2015 | |
| CN | 108833070 | A | * | 11/2018 | ............ H04L 27/26 |
| CN | 109150468 | A | | 1/2019 | |
| CN | 109391576 | A | * | 2/2019 | ........... H04L 27/261 |
| EP | 3949181 | B1 | * | 11/2023 | ........... H04B 17/336 |
| WO | 2008132029 | A2 | | 11/2008 | |
| WO | WO-2018130311 | A1 | * | 7/2018 | ........... H04J 11/0073 |
| WO | WO-2020135948 | A1 | * | 7/2020 | ............ H04L 1/189 |

OTHER PUBLICATIONS

Intel Corporation, "Receiver Algorithms and Complexity Analyses for NB-IoT Synchronization," 3GPP TSG RAN WG1 NB-IoT Ad-Hoc #2, R1-161897, Sophia Antipolis, France, Mar. 22-24, 2016, 9 pages.

Lu et al., "PN-Chirp Codes based on Multi-Correlation Receiver in a Bandlimited Channel," 2011 12th International Radar Symposium (IRS), Sep. 7, 2011, 6 pages.

MediaTek Inc., "Receiver Complexity and Performance for NB-IoT Synchronization," 3GPP TSG RAN WG1 NB-IoT Ad-Hoc Meeting, R1-161945, Sophia Antipolis, France, Mar. 22-24, 2016, 7 pages.

PCT International Search Report and Written Opinion issued in International Application No. PCT/CN2019/123104 on Aug. 26, 2020, 15 pages (with English translation).

* cited by examiner

SEQUENCE DETECTION METHOD AND DEVICE

CROSS-REFERENCE TO RELATED APPLICATIONS

This application is a continuation of International Application No. PCT/CN2019/123104, filed on Dec. 4, 2019, the disclosure of which is hereby incorporated by reference in its entirety.

TECHNICAL FIELD

This application relates to the field of mobile communications technologies, and in particular, to a sequence detection method and a device.

BACKGROUND

A random access channel (random access channel, RACH) is an uplink channel in a wireless communications system, and may be used to estimate a propagation delay of an uplink signal. An uplink time advance (time advance, TA) of a terminal device may be determined by using the propagation delay, so that the terminal device can adjust a transmit time of the uplink signal based on the uplink TA.

When transmitting a RACH sequence, the terminal device does not know the uplink TA. A base station serving as a receive end of a RACH signal needs to detect whether all sequences in a sequence set configured in this cell are sent. Because the base station does not know a distance from the terminal device to the base station, that is, does not know the propagation delay of the RACH sequence, the RACH sequence received by the base station may be obtained by performing time domain cyclic shifting on the RACH sequence sent by the terminal device. Therefore, the base station needs to calculate cross correlation values between the received RACH sequence and all possible time domain cyclic shift sequences of all the RACH sequences of this cell, and determine, based on peaks of the obtained cross correlation values, which RACH sequence the received RACH sequence actually is, to complete detection of the RACH sequence.

It can be learned that, currently, the base station needs to calculate the cross correlation values between the received RACH sequence and all the possible time domain cyclic shift sequences of all the RACH sequences of this cell, and consequently, calculation complexity is relatively high.

SUMMARY

Embodiments of this application provide a sequence detection method and a device, to reduce complexity of sequence detection.

According to a first aspect, a first sequence detection method is provided. The method includes: receiving a first sequence carried on a plurality of subcarriers; differentiating the first sequence based on L granularities, to obtain a first differential sequence set including L sequences, where L is a positive integer; obtaining a differential sequence cross correlation value set corresponding to each candidate frequency domain root sequence in U candidate frequency domain root sequences, based on the first differential sequence set, where in a differential sequence cross correlation value set corresponding to a $u^{th}$ candidate frequency domain root sequence in the U candidate frequency domain root sequences, an $l^{th}$ first cross correlation value is a first cross correlation value between an $l^{th}$ sequence in the first differential sequence set and an $l^{th}$ sequence in a second differential sequence set corresponding to the uh candidate frequency domain root sequence, l=1, 2, ..., L, the second differential sequence set corresponding to the $u^{th}$ candidate frequency domain root sequence is a sequence set obtained by differentiating the $u^{th}$ candidate frequency domain root sequence based on the L granularities, a differentiation granularity corresponding to the $l^{th}$ sequence in the first differential sequence set is the same as that corresponding to the $l^{th}$ sequence in the second differential sequence set corresponding to the $u^{th}$ candidate frequency domain root sequence, u=1, 2, ..., U, and U is a positive integer; determining K candidate frequency domain root sequences in the U candidate frequency domain root sequences based on differential sequence cross correlation value sets corresponding to the U candidate frequency domain root sequences, where K is an integer less than U; and determining a candidate frequency domain root sequence and a time domain cyclic shift value that correspond to the first sequence, based on the first sequence and the K candidate frequency domain root sequences.

The method may be performed by a first communications apparatus. The first communications apparatus may be a communications device, or may be a communications apparatus such as a chip, that can support the communications device in implementing a function required in the method. For example, the first communications apparatus is a network device, a chip that is disposed in the network device and that is configured to implement functions of the network device, or another component configured to implement functions of the network device. In the following description process, an example in which the first communications apparatus is a network device is used.

In this embodiment of this application, a signal receive end (for example, the network device) may first filter the K candidate frequency domain root sequences based on a differentiation result of the received first sequence and differentiation results of candidate frequency domain root sequences, and only need to determine, based on the first sequence and the K candidate frequency domain root sequences, a candidate frequency domain root sequence to which the first sequence actually corresponds. For example, there are U candidate frequency domain root sequences. In this case, a current calculation amount is calculation of $U*C_s$ cross correlation values. In this embodiment of this application, a calculation amount is calculation of only $L*U+K*C_s$, where $C_s$ represents a quantity of sampled time domain cyclic shift values, and L represents a quantity of differentiation granularities. If K is less than U, the calculation amount required in this embodiment of this application is far less than the calculation amount required for current sequence detection. Therefore, the technical solution in this embodiment of this application can greatly reduce detection complexity of the signal receive end, and improve detection efficiency of the signal receive end.

In a possible implementation, the $u^{th}$ candidate root sequence is a ZC sequence, a truncated sequence of the ZC sequence, or a cyclic extended sequence of the ZC sequence, or the $u^{th}$ candidate frequency domain root sequence satisfies the following relationship:

$$S_u(n) = \alpha e^{-j2\pi\left(\frac{u_1 \times (n \bmod P) - u_2)^3 + \beta n}{P} + \varphi\right)};$$

where n=0, 1, 2, ..., N−1, N represents a length of the $u^{th}$ frequency domain root sequence, $S^u(n)$ represents an $n^{th}$ element of the $u^{th}$ frequency domain root sequence, a is a non-zero complex number, φ is a real number, β is a real number, j represents an imaginary number symbol in a complex number, mod represents a modulo operation, $u_1$ and $u_2$ represent root indexes of the $u^{th}$ frequency domain root sequence, a value range of $u_1$ is positive integers less than or equal to P−1, a value range of $u_2$ is natural numbers less than or equal to P−1, and P is a prime number.

For example, types of the U candidate frequency domain root sequences are all the same. For example, the U candidate frequency domain root sequences are all ZC sequences, or truncated sequences of the ZC sequences, or cyclic extended sequences of the ZC sequences, or all satisfy the foregoing relationship. Alternatively, the types of the U candidate frequency domain root sequences may be different. For example, in the U candidate frequency domain root sequences, some candidate frequency domain root sequences are ZC sequences, some frequency domain root sequences satisfy the foregoing relationship, or some frequency domain root sequences are cyclic extended sequences of ZC sequences.

In a possible implementation, the $l^{th}$ sequence in the first differential sequence set satisfies the following relationship:

$$d_l(n) = r(n) \times r((n+l) \bmod N)^*;$$

where n=0, 1, 2, ..., N−1, or n=0, 1, 2, ..., N−1−l, $d_l(n)$ represents an $n^{th}$ element of the $l^{th}$ sequence in the first differential sequence, or represents a conjugate of the $n^{th}$ element of the $l^{th}$ sequence in the first differential sequence, r(n) represents an $n^{th}$ element of the first sequence, l represents a differentiation granularity, $l \in \{1, 2, ..., L\}$, and mod represents a modulo operation.

The network device differentiates the first sequence based on the L granularities, so that the L sequences can be obtained. For example, the L sequences may also be referred to as L first differential sequences. For example, the L first differential sequences belong to the first differential sequence set. The first sequence is differentiated based on the differentiation granularity L. For example, in one manner, the $n^{th}$ element of the first sequence is multiplied by a conjugate of an $(n+l)^{th}$ element, to obtain a new sequence, namely, a first differential sequence in the L first differential sequences. For example, L=2, and l may be separately 1 and 2. In this case, the network device differentiates the first sequence based on the differentiation granularity 1, to obtain one first differential sequence. The first differential sequence may satisfy $d_l(n) = r(n) \times r((n+1) \bmod N)^*$. In addition, the network device differentiates the first sequence based on the differentiation granularity 2, to obtain another first differential sequence. The first differential sequence may satisfy $d_l(n) = r(n) \times r((n+2) \bmod N)^*$. In this differentiation manner, one or more differential sequences may be obtained based on the first sequence, and this manner is relatively simple and easy-to-use.

In a possible implementation, the $l^{th}$ sequence in the second differential sequence set corresponding to the $u^{th}$ candidate frequency domain root sequence satisfies the following relationship:

$$c_{u,l}(n) = S_u(n) \times S_u((n+l) \bmod N)^*;$$

where n=0, 1, 2, ..., N−1, or n=0, 1, 2, ..., N−1−l, $c_{u,l}(n)$ represents an $n^{th}$ element of the $l^{th}$ sequence in the second differential sequence set corresponding to the $u^{th}$ candidate frequency domain root sequence, or represents a conjugate of the $n^{th}$ element of the $l^{th}$ sequence in the second differential sequence set corresponding to the $u^{th}$ candidate frequency domain root sequence, $S_u(n)$ represents an $n^{th}$ element of the $u^{th}$ candidate frequency domain root sequence, $u \in \{1, 2, ..., U\}$, l represents a differentiation granularity, $l \in \{1, 2, ..., L\}$, and mod represents a modulo operation.

The network device may differentiate the $u^{th}$ candidate frequency domain root sequence based on the L differentiation granularities, to obtain the second differential sequence set. The second differential sequence set includes L sequences. For example, the L sequences may also be referred to as L second differential sequences. In this case, the second differential sequence set includes the L second differential sequences. The network device can differentiate all the U candidate frequency domain root sequences based on the L differentiation granularities. For each candidate frequency domain root sequence in the U candidate frequency domain root sequences, a corresponding second differential sequence set can be obtained. For example, L=2, and l may be separately 1 and 2. In this case, the network device differentiates the $u^{th}$ candidate frequency domain root sequence based on the differentiation granularity 1, to obtain one second differential sequence. The second differential sequence may satisfy $c_{u,l}(n) = S_u(n) \times S_u((n+1) \bmod N)^*$. In addition, the network device differentiates the $u^{th}$ candidate frequency domain root sequence based on the differentiation granularity 2, to obtain one second differential sequence. The second differential sequence may satisfy $c_{u,l}(n) = S_u(n) \times S_u((n+2) \bmod N)^*$. When differentiating the first sequence and the $u^{th}$ candidate frequency domain root sequence, the network device uses the same L differentiation granularities. Therefore, from the perspective of the differentiation granularity, the differentiation result of the first sequence (namely, the obtained L first differential sequences) and the differentiation result of the $u^{th}$ candidate frequency domain root sequence (namely, the obtained L second differential sequences) may be in one-to-one correspondence with each other, or in other words, the L first differential sequences in the first differential sequence set and the L second differential sequences in the second differential sequence set may be in one-to-one correspondence with each other. Correspondence herein means that differentiation granularities are the same. The frequency domain root sequence and the first sequence are differentiated based on the same granularities, so that the differentiation results (namely, the first differential sequences and the second differential sequences) are in one-to-one correspondence with each other, thereby helping the network device perform subsequent processing. For example, the network device may obtain a first cross correlation value between a first differential sequence and a second differential sequence that correspond to each other.

In a possible implementation, the determining K candidate frequency domain root sequences in the U candidate frequency domain root sequences based on differential sequence cross correlation value sets corresponding to the U candidate frequency domain root sequences includes:

obtaining a cross correlation coefficient corresponding to each candidate frequency domain root sequence, based on the differential sequence cross correlation value set corresponding to each candidate frequency domain root sequence in the U candidate frequency domain root sequences, and determining the K candidate frequency domain root sequences in the U candidate frequency domain root sequences based on U cross correlation coefficients.

To be specific, the network device may filter the K candidate frequency domain root sequences based on a differentiation result of the received first sequence and differentiation results of candidate frequency domain root sequences, and only need to determine, based on the first sequence and the K candidate frequency domain root sequences, a candidate frequency domain root sequence to which the first sequence actually corresponds. For example, there are U candidate frequency domain root sequences. In this case, a current calculation amount is calculation of $U*C_s$ cross correlation values. In this embodiment of this application, a calculation amount is calculation of only $L*U+ K*C_s$, where $C_s$ represents a quantity of sampled time domain cyclic shift values, and L represents a quantity of differentiation granularities. If K is less than U, the calculation amount required in this embodiment of this application is far less than the calculation amount required for current sequence detection. Therefore, the technical solution in this embodiment of this application can greatly reduce detection complexity of the network device, and improve detection efficiency of the network device.

In a possible implementation.
   a cross correlation coefficient corresponding to the $u^{th}$ candidate frequency domain root sequence is a sum of L first cross correlation values in the differential sequence cross correlation value set corresponding to the $u^{th}$ candidate frequency domain root sequence;
   a cross correlation coefficient corresponding to the $u^{th}$ candidate frequency domain root sequence is an average value of first cross correlation values in the differential sequence cross correlation value set corresponding to the $u^{th}$ candidate frequency domain root sequence; or
   a cross correlation coefficient corresponding to the $u^{th}$ candidate frequency domain root sequence is a largest value of first cross correlation values in the differential sequence cross correlation value set corresponding to the $u^{th}$ candidate frequency domain root sequence.

The network device may obtain the cross correlation coefficient corresponding to the $u^{th}$ candidate frequency domain root sequence, based on the differential sequence cross correlation value set corresponding to the $u^{th}$ candidate frequency domain root sequence, or in other words, based on the L first cross correlation values corresponding to the $u^{th}$ candidate frequency domain root sequence. For example, in one manner, the network device adds up the L first cross correlation values corresponding to the $u^{th}$ candidate frequency domain root sequence, and the obtained result is used as the cross correlation coefficient corresponding to the $u^{th}$ candidate frequency domain root sequence, or in other words, the cross correlation coefficient corresponding to the $u^{th}$ candidate frequency domain root sequence is the sum of the L first cross correlation values corresponding to the $u^{th}$ candidate frequency domain root sequence. The cross correlation coefficient obtained in this manner is obtained by comprehensively considering the L first cross correlation values corresponding to the $u^{th}$ candidate frequency domain root sequence, so that the determined cross correlation coefficient is more accurate.

Alternatively, in another manner, the network device may determine the largest value of the L first cross correlation values corresponding to the $u^{th}$ candidate frequency domain root sequence, and the largest value may be used as the cross correlation coefficient corresponding to the $u^{th}$ candidate frequency domain root sequence, or in other words, the cross correlation coefficient corresponding to the $u^{th}$ candidate frequency domain root sequence is the largest value of the L first cross correlation values corresponding to the $u^{th}$ candidate frequency domain root sequence. In this manner, only one largest value needs to be selected from the L first cross correlation values, and no other processing needs to be performed on the L first cross correlation values, so that implementation is relatively easy.

Alternatively, in still another manner, the network device may obtain the average value of the L first cross correlation values corresponding to the $u^{th}$ candidate frequency domain root sequence, and the obtained average value is used as the cross correlation coefficient corresponding to the $u^{th}$ candidate frequency domain root sequence, or in other words, the cross correlation coefficient corresponding to the $u^{th}$ candidate frequency domain root sequence is the average value of the L first cross correlation values corresponding to the $u^{th}$ candidate frequency domain root sequence. The average value herein may be an arithmetic average value, or a weighted average value. If the average value is a weighted average value, a weight corresponding to the L first cross correlation values may be configured by the network device, specified by a protocol, or the like. The cross correlation coefficient obtained in this manner is obtained by comprehensively considering the L first cross correlation values corresponding to the $u^{th}$ candidate frequency domain root sequence, so that the determined cross correlation coefficient is more accurate. In addition, a value of the cross correlation coefficient obtained by performing averaging is relatively small, and a calculation amount during subsequent determining can also be reduced.

Certainly, only several possibilities are listed herein. A manner of obtaining the cross correlation coefficient corresponding to the candidate frequency domain root sequence by the network device is not limited in this embodiment of this application.

In a possible implementation,
   K cross correlation coefficients corresponding to the K candidate frequency domain root sequences are greater than U−K cross correlation coefficients corresponding to U−K candidate frequency domain root sequences; or
   K cross correlation coefficients corresponding to the K candidate frequency domain root sequences are greater than a first threshold.

After obtaining U cross correlation coefficients, the network device may select the K candidate frequency domain root sequences from the U candidate frequency domain root sequences based on the U cross correlation coefficients. For example, the network device may select K cross correlation coefficients with relatively large values from the U cross correlation coefficients, and the K cross correlation coefficients correspond to the K candidate frequency domain root sequences. In other words, the K cross correlation coefficients corresponding to the K candidate frequency domain root sequences are greater than the U−K cross correlation coefficients corresponding to U−K candidate frequency domain root sequences. The U−K candidate frequency domain root sequences are candidate frequency domain root sequences other than the K candidate frequency domain root sequences in the U candidate frequency domain root sequences. Alternatively, the network device may not compare the U cross correlation coefficients with each other, and instead, may compare the U cross correlation coefficients with the first threshold, and select the K candidate frequency domain root sequences whose cross correlation coefficients are greater than the first threshold. For example, the first threshold is configured by the network device, or is configured by a core network device, or may be specified by a protocol. Regardless of the manner of selecting the K candidate frequency domain root sequences, the K candidate frequency domain root sequences selected by the network device correspond to relatively large cross correlation coefficients. The cross correlation coefficient is correlated with the received first sequence. A larger cross correlation coefficient indicates a higher possibility that the candidate frequency domain root sequence is correlated with the received first sequence. Therefore, the network device may filter candidate frequency domain root sequences with relatively high correlation with the received first sequence, and then determine, from these candidate frequency domain root sequences, a candidate frequency domain root sequence corresponding to the received first sequence, so that a success rate of detecting the first sequence can be ensured to the greatest extent and detection complexity can be reduced.

In a possible implementation, the determining a candidate frequency domain root sequence and a time domain cyclic shift value that correspond to the first sequence, based on the first sequence and the K candidate frequency domain root sequences includes:

obtaining a second cross correlation value between the first sequence and a time domain cyclic shift sequence that corresponds to each candidate frequency domain root sequence in the K candidate frequency domain root sequences;

determining the candidate frequency domain root sequence and the time domain cyclic shift value that correspond to the first sequence, based on the second cross correlation value.

For example, the network device may obtain the cross correlation value between the first sequence and each time domain cyclic shift sequence that corresponds to each candidate frequency domain root sequence in the K candidate frequency domain root sequences. For example, the cross correlation value herein is referred to as the second cross correlation value. After obtaining the second cross correlation value between the first sequence and each time domain cyclic shift sequence that corresponds to each candidate frequency domain root sequence in the K candidate frequency domain root sequences, the network device may determine whether the second cross correlation value is greater than a threshold, and a time domain cyclic shift sequence corresponding to the second cross correlation value greater than the threshold is a sequence corresponding to the first sequence. Optionally, before determining whether the second cross correlation value is greater than the threshold, the network device may perform noise normalization on the second cross correlation value, and then determine whether the second cross correlation value is greater than the threshold. A time domain cyclic shift sequence corresponding to a cross correlation value greater than the threshold corresponds to one candidate frequency domain root sequence and corresponds to one time domain cyclic shift value. This is equivalent to determining, by the network device, the candidate frequency domain root sequence and the time domain cyclic shift value that correspond to the first sequence.

After determining the candidate frequency domain root sequence and the time domain cyclic shift value that correspond to the first sequence, for example, the network device may determine whether a terminal device transmits a RACH signal and determine a sequence based on which the transmitted RACH signal is generated, and may further determine a delay of the terminal device based on the time domain cyclic shift value, to determine an uplink TA for the terminal device based on the delay. The network device may notify the terminal device of the determined uplink TA, so that the terminal device can adjust a transmit time of an uplink signal based on the uplink TA. For example, for a terminal device with a larger propagation delay, the uplink TA may be larger, to be specific, the transmit time of the uplink signal is earlier. In this way, it can be ensured to the greatest extent that signals of all terminal devices reach the network device at a basically same time. Alternatively, the network device may further apply the candidate frequency domain root sequence and/or the time domain cyclic shift value for other purposes.

According to a second aspect, a second sequence detection method is provided. The method includes: receiving a first sequence carried on a plurality of subcarriers; converting the first sequence from frequency domain to time domain, to obtain a second sequence; differentiating the second sequence based on L granularities, to obtain a first differential sequence set including L sequences, where L is a positive integer; obtaining a differential sequence cross correlation value set corresponding to each basic time domain sequence in U basic time domain sequences, based on the first differential sequence set, where in a differential sequence cross correlation value set corresponding to a $u^{th}$ basic time domain sequence in the U basic time domain sequences, an $l^{th}$ first cross correlation value is a first cross correlation value between an $l^{th}$ sequence in the first differential sequence set and an $l^{th}$ sequence in a second differential sequence set corresponding to the $u^{th}$ basic time domain sequence, l=1, 2, . . . , L, the second differential sequence set corresponding to the $u^{th}$ basic time domain sequence is a sequence set obtained by differentiating the $u^{th}$ basic time domain sequence based on the L granularities, a differentiation granularity corresponding to the $l^{th}$ sequence in the first differential sequence set is the same as that corresponding to the $l^{th}$ sequence in the second differential sequence set corresponding to the $u^{th}$ basic time domain sequence, u=1, 2, . . . , U, and U is a positive integer; determining K basic time domain sequences in the U basic time domain sequences based on differential sequence cross correlation value sets corresponding to the U basic time domain sequences, where K is an integer less than U; and determining a basic time domain sequence and a frequency domain cyclic shift value that correspond to the second sequence, based on the second sequence and the K basic time domain sequences.

The method may be performed by a second communications apparatus. The second communications apparatus may be a communications device, or may be a communications apparatus such as a chip, that can support the communications device in implementing a function required in the method. For example, the second communications apparatus is a network device, a chip that is disposed in the network device and that is configured to implement functions of the network device, or another component configured to implement functions of the network device. In the following description process, an example in which the second communications apparatus is a network device is used.

In this embodiment of this application, a signal receive end (for example, the network device) may first filter the K basic time domain sequences based on a differentiation result of the second sequence corresponding to the received first sequence and differentiation results of candidate basic time domain sequences, and only need to determine, based on the second sequence and the K basic time domain sequences, a basic time domain sequence to which the second sequence actually corresponds. For example, there are U candidate basic time domain sequences. In this case, a current calculation amount is calculation of $U*C_s$ cross correlation values. In this embodiment of this application, a calculation amount is calculation of only $L*C_s+K*U$, where $C_s$ represents a quantity of sampled time domain cyclic shift values (for example, each basic sequence in basic sequences corresponding to the U basic time domain sequences corresponds to a same quantity of time domain cyclic shift values, and the quantity is $C_s$), and L represents a quantity of differentiation granularities. If K is less than U, the calculation amount required in this embodiment of this application is far less than the calculation amount required for current sequence detection. Therefore, the technical solution in this embodiment of this application can greatly reduce detection complexity of the signal receive end, and improve detection efficiency of the signal receive end.

In a possible implementation, the $u^{th}$ basic time domain sequence satisfies the following relationship:

$$x_u(n) = \alpha e^{j2\pi\left(\frac{u_1((n+m) \bmod P)^3}{P}+\varphi\right)}$$

where n=0, 1, 2, ..., N−1, N represents a length of the $u^{th}$ basic time domain sequence, $x_u(n)$ represents an $n^{th}$ element of the $u^{th}$ basic time domain sequence, a is a non-zero complex number, φ is a real number, j represents an imaginary number symbol in a complex number, mod represents a modulo operation, $u_1$ represents an index of the basic time domain sequence, a value range of $u_1$ is positive integers less than or equal to P−1, m represents a time domain cyclic shift value of the basic time domain sequence, a value range of m is natural numbers less than or equal to P−1, and P is a prime number.

For example, each basic time domain sequence in the U basic time domain sequences may satisfy the foregoing relationship, or some of the U basic time domain sequences may satisfy the foregoing relationship, and remaining basic time domain sequences in the U basic time domain sequences may not satisfy the foregoing relationship, for example, may satisfy another relationship.

In a possible implementation, the $l^{th}$ sequence in the first differential sequence set satisfies the following relationship:

$$f_l(n)=t(n) \times t((n+l) \bmod N)^*;$$

where n=0, 1, 2, ..., N−1, or n=0, 1, 2, ..., N−1−l, $f_l(n)$ represents an $n^{th}$ element of the $l^{th}$ sequence in the first differential sequence set, or represents a conjugate of the $n^{th}$ element of the $l^{th}$ sequence in the first differential sequence set, t(n) represents an $n^{th}$ element of the second sequence, l represents a differentiation granularity, l∈(1, 2, ..., L), and mod represents a modulo operation.

The network device differentiates the second sequence based on the L granularities, so that the L sequences can be obtained. For example, the L sequences may also be referred to as L first differential sequences. For example, the L first differential sequences belong to the first differential sequence set. The second sequence is differentiated based on the differentiation granularity l. For example, in one manner, the $n^{th}$ element of the second sequence is multiplied by a conjugate of an $(n-l)^{th}$ element, to obtain a new sequence, namely, a first differential sequence in the L first differential sequences. For example, L=2, and l may be separately 1 and 2. In this case, the network device differentiates the second sequence based on the differentiation granularity 1, to obtain one first differential sequence. The first differential sequence may satisfy $f_l(n)=t(n) \times t((n+1) \bmod N)^*$. In addition, the network device differentiates the second sequence based on the differentiation granularity 2, to obtain another first differential sequence. The first differential sequence may satisfy $f_l(n)=t(n) \times t((n+2) \bmod N)^*$. In this differentiation manner, one or more differential sequences may be obtained based on the first sequence, and this manner is relatively simple and easy-to-use.

In a possible implementation, the $l^{th}$ sequence in the second differential sequence set corresponding to the $u^{th}$ basic time domain sequence satisfies the following relationship:

$$g_{u,l}(n)=x_u(n) \times x_u((n+l) \bmod N)^*;$$

where n=0, 1, 2, ..., N−1, or n=0, 1, 2, ..., N−1−l, $g_{u,l}(n)$ represents an $n^{th}$ element of the $l^{th}$ sequence in the second differential sequence set corresponding to the $u^{th}$ basic time domain sequence, or represents a conjugate of the $n^{th}$ element of the $l^{th}$ sequence in the second differential sequence set corresponding to the $u^{th}$ basic time domain sequence, $x_u(n)$ represents an $n^{th}$ element of the $u^{th}$ basic time domain sequence, u∈{1, 2, ..., U}, l represents a differentiation granularity, l∈{1, 2, ..., L}, and mod represents a modulo operation.

For example, the network device may differentiate the $u^{th}$ basic time domain sequence based on the L differentiation granularities, to obtain the second differential sequence set. The second differential sequence set includes L sequences. For example, the L sequences may also be referred to as L second differential sequences. For example, the L second differential sequences belong to the second differential sequence set. The network device may differentiate all the U basic time domain sequences based on the L differentiation granularities. For each basic time domain sequence in the U basic time domain sequences, a corresponding second differential sequence set can be obtained. For example, L=2, and l may be separately 1 and 2. In this case, the network device differentiates the $u^{th}$ basic time domain sequence based on the differentiation granularity 1, to obtain one second differential sequence. The second differential sequence may satisfy $g_{u,l}(n)=x_u(n) \times x_u((n+1) \bmod N)^*$. In addition, the network device differentiates the $u^{th}$ basic time domain sequence based on the differentiation granularity 2, to obtain one second differential sequence. The second differential sequence may satisfy $g_{u,l}(n)=x_u(n) \times x_u((n+2) \bmod N)^*$. When differentiating the second sequence and the $u^{th}$ basic time domain sequence, the network device uses the same L differentiation granularities. Therefore, from the perspective of the differentiation granularity, the differentiation result of the second sequence (namely, the obtained L first differential sequences) and the differentiation result of the $u^{th}$ basic time domain sequence (namely, the obtained L second differential sequences) may be in one-to-one correspondence with each other, or in other words, the L first differential sequences in the first differential sequence set and the L second differential sequences in the second differential sequence set may be in one-to-one correspondence with each other. Correspondence herein means that differentiation granularities are the same. The basic time domain sequence and the second sequence are differentiated based on the same granularities, so that the differentiation results (namely, the first differential sequences and the second differential sequences) are in one-to-one correspondence with each other, thereby helping the network device perform subsequent processing. For example, the network device may obtain a first cross correlation value between a first differential sequence and a second differential sequence that correspond to each other.

In a possible implementation, the determining K basic time domain sequences in the U basic time domain sequences based on differential sequence cross correlation value sets corresponding to the U basic time domain sequences includes:

obtaining a cross correlation coefficient corresponding to each basic time domain sequence, based on the differential sequence cross correlation value set corresponding to each basic time domain sequence in the U basic time domain sequences; and determining the K basic time domain sequences in the U basic time domain sequences based on U cross correlation coefficients.

To be specific, the network device may first filter the K basic time domain sequences based on a differentiation result of the second sequence corresponding to the received first sequence and differentiation results of candidate basic time domain sequences, and only need to determine, based on the second sequence and the K basic time domain sequences, a basic time domain sequence to which the second sequence actually corresponds. For example, there are U candidate basic time domain sequences. In this case, a current calculation amount is calculation of $U*C_s$ cross correlation values. In this embodiment of this application, a calculation amount is calculation of only $L*C_s+K*U$, where $C_s$ represents a quantity of sampled time domain cyclic shift values (for example, each basic sequence in basic sequences corresponding to the U basic time domain sequences corresponds to a same quantity of time domain cyclic shift values, and the quantity is $C_s$), and L represents a quantity of differentiation granularities. If K is less than U, the calculation amount required in this embodiment of this application is far less than the calculation amount required for current sequence detection. Therefore, the technical solution in this embodiment of this application can greatly reduce detection complexity of the receive end, and improve detection efficiency of the receive end.

In a possible implementation, a cross correlation coefficient corresponding to the $u^{th}$ basic time domain sequence is a sum of L first cross correlation values in the differential sequence cross correlation value set corresponding to the $u^{th}$ basic time domain sequence;

a cross correlation coefficient corresponding to the $u^{th}$ basic time domain sequence is an average value of L cross correlation values in the differential sequence cross correlation value set corresponding to the $u^{th}$ basic time domain sequence; or a cross correlation coefficient corresponding to the $u^{th}$ basic time domain sequence is a largest value of L cross correlation values in the differential sequence cross correlation value set corresponding to the $u^{th}$ basic time domain sequence.

The network device may obtain the cross correlation coefficient corresponding to the $u^{th}$ basic time domain sequence, based on the differential sequence cross correlation value set corresponding to the $u^{th}$ basic time domain sequence, or in other words, based on the L first cross correlation values corresponding to the $u^{th}$ basic time domain sequence. For example, in one manner, the network device adds up the L first cross correlation values corresponding to the $u^{th}$ basic time domain sequence, and the obtained result is used as the cross correlation coefficient corresponding to the $u^{th}$ basic time domain sequence, or in other words, the cross correlation coefficient corresponding to the $u^{th}$ basic time domain sequence is the sum of the L first cross correlation values corresponding to the $u^{th}$ basic time domain sequence. The cross correlation coefficient obtained in this manner is obtained by comprehensively considering the L first cross correlation values corresponding to the $u^{th}$ basic time domain sequence, so that the determined cross correlation coefficient is more accurate.

Alternatively, in another manner, the network device may determine the largest value of the L first cross correlation values corresponding to the $u^{th}$ basic time domain sequence, and the largest value may be used as the cross correlation coefficient corresponding to the $u^{th}$ basic time domain sequence, or in other words, the cross correlation coefficient corresponding to the $u^{th}$ basic time domain sequence is the largest value of the L first cross correlation values corresponding to the $u^{th}$ basic time domain sequence. In this manner, only one largest value needs to be selected from the L first cross correlation values, and no other processing needs to be performed on the L first cross correlation values, so that implementation is relatively easy.

Alternatively, in still another manner, the network device may obtain the average value of the L first cross correlation values corresponding to the $u^{th}$ basic time domain sequence, and the obtained average value is used as the cross correlation coefficient corresponding to the $u^{th}$ basic time domain sequence, or in other words, the cross correlation coefficient corresponding to the $u^{th}$ basic time domain sequence is the average value of the L first cross correlation values corresponding to the $u^{th}$ basic time domain sequence. The average value herein may be an arithmetic average value, or a weighted average value. If the average value is a weighted average value, a weight corresponding to the L first cross correlation values may be configured by the network device, specified by a protocol, or the like. The cross correlation coefficient obtained in this manner is obtained by comprehensively considering the L first cross correlation values corresponding to the $u^{th}$ basic time domain sequence, so that the determined cross correlation coefficient is more accurate. In addition, a value of the cross correlation coefficient obtained by performing averaging is relatively small, and a calculation amount during subsequent determining can also be reduced.

Certainly, only several possibilities are listed herein. A manner of obtaining the cross correlation coefficient corresponding to the basic time domain sequence by the network device is not limited in this embodiment of this application.

In a possible implementation,

K cross correlation coefficients corresponding to the K basic time domain sequences are greater than U−K cross correlation coefficients corresponding to U−K basic time domain sequences; or K cross correlation coefficients corresponding to the K basic time domain sequences are greater than a first threshold.

After obtaining U cross correlation coefficients, the network device may select the K basic time domain sequences from the U basic time domain sequences based on the U cross correlation coefficients. For example, the network device may select K cross correlation coefficients with relatively large values from the U cross correlation coefficients, and the K cross correlation coefficients correspond to the K basic time domain sequences. In other words, the K cross correlation coefficients corresponding to the K basic time domain sequences are greater than the U−K cross correlation coefficients corresponding to U−K basic time domain sequences. The U−K candidate frequency domain root sequences are basic time domain sequences other than the K basic time domain sequences in the U candidate frequency domain root sequences. Alternatively, the network device may not compare the U cross correlation coefficients with each other, and instead, may compare the U cross correlation coefficients with the first threshold, and select the K basic time domain sequences whose cross correlation coefficients are greater than the first threshold. For example, the first threshold is configured by the network device, or is configured by a core network device, or may be specified by a protocol. Regardless of the manner of selecting the K basic time domain sequences, the K basic time domain sequences selected by the network device correspond to relatively large cross correlation coefficients. The cross correlation coefficient is correlated with the received first sequence. A larger cross correlation coefficient indicates a higher possibility that the basic time domain sequence is correlated with the received first sequence. Therefore, the network device may filter basic time domain sequences with relatively high correlation with the received first sequence, and then determine, from these basic time domain sequences, a basic time domain sequence corresponding to the received first sequence, so that a success rate of detecting the first sequence can be ensured to the greatest extent and detection complexity can be reduced.

In a possible implementation, the determining a basic time domain sequence and a frequency domain cyclic shift value that correspond to the second sequence, based on the second sequence and the K basic time domain sequences includes:

obtaining a second cross correlation value between the second sequence and a frequency domain cyclic shift sequence that corresponds to each basic time domain sequence in the K basic time domain sequences; and determining the basic time domain sequence and the frequency domain cyclic shift value that correspond to the second sequence, based on the second cross correlation value.

For example, the network device may obtain the cross correlation value between the second sequence and each frequency domain cyclic shift sequence that corresponds to each basic time domain sequence in the K basic time domain sequences. For example, the cross correlation value herein is referred to as the second cross correlation value. After obtaining the second cross correlation value between the second sequence and each frequency domain cyclic shift sequence that corresponds to each basic time domain sequence in the K basic time domain sequences, the network device may determine whether the second cross correlation value is greater than a threshold, and a time domain cyclic shift sequence corresponding to the cross correlation value greater than the threshold is a sequence corresponding to the first sequence. Optionally, before determining whether the second cross correlation value is greater than the threshold, the network device may perform noise normalization on the second cross correlation value, and then determine whether the second cross correlation value is greater than the threshold. A frequency domain cyclic shift sequence corresponding to a second cross correlation value greater than the threshold corresponds to one basic time domain sequence and corresponds to one frequency domain cyclic shift value. This is equivalent to determining, by the network device, the basic time domain sequence and the frequency domain cyclic shift value that correspond to the second sequence. The basic time domain sequence and the frequency domain cyclic shift value that correspond to the second sequence are the basic time domain sequence and the frequency domain cyclic shift value that correspond to the first sequence.

After determining the basic time domain sequence and the frequency domain cyclic shift value that correspond to the second sequence, for example, the network device may determine, based on the basic time domain sequence and/or the frequency domain cyclic shift value, whether a terminal device transmits a RACH signal and determine a sequence based on which the transmitted RACH signal is generated, and may further determine a delay of the terminal device, to determine an uplink TA for the terminal device based on the delay. The network device may notify the terminal device of the determined uplink TA, so that the terminal device can adjust a transmit time of an uplink signal based on the uplink TA. For example, for a terminal device with a larger propagation delay, the uplink TA may be larger, to be specific, the transmit time of the uplink signal is earlier. In this way, it can be ensured to the greatest extent that signals of all terminal devices reach the network device at a basically same time. Alternatively, the network device may further apply the basic time domain sequence and/or the frequency domain cyclic shift value for other purposes.

According to a third aspect, a communications apparatus is provided. For example, the communications apparatus is the first communications apparatus described above. The first communications apparatus is configured to perform the method according to any one of the first aspect and the possible implementations. Specifically, the first communications apparatus may include modules configured to perform the method according to any one of the first aspect and the possible implementations, for example, include a processing module and a transceiver module. For example, the transceiver module may include a sending module and a receiving module. The sending module and the receiving module may be different functional modules, and implement sending and receiving functions respectively, or may be a same functional module, and the functional module can implement receiving and sending functions. For example, the first communications apparatus is a communications device, or is a chip or another component disposed in the communications device. For example, the communications device is a network device. The following uses an example in which the first communications apparatus is a network device. For example, the transceiver module may be alternatively implemented as a transceiver, and the processing module may be alternatively implemented as a processor. Alternatively, the sending module may be implemented by using a transmitter, the receiving module may be implemented by using a receiver, the transmitter and the receiver may be different functional modules, or may be a same functional module. If the first communications apparatus is a communications device, the transceiver is implemented as, for example, an antenna, a feeder, and a codec in the communications device. Alternatively, if the first communications apparatus is a chip disposed in the communications device, the transceiver (or the transmitter and the receiver) is, for example, a communications interface in the chip, and the communications interface is connected to a radio frequency transceiver component in the communications device, to implement information receiving and sending via the radio frequency transceiver component. In a description process of the third aspect, description is provided still by using an example in which the first communications apparatus is a network device, and the first communications apparatus includes the processing module and the transceiver module.

The transceiver module is configured to receive a first sequence carried on a plurality of subcarriers.

The processing module is configured to differentiate the first sequence based on L granularities, to obtain a first differential sequence set including L sequences, where L is a positive integer.

The processing module is further configured to obtain a differential sequence cross correlation value set corresponding to each candidate frequency domain root sequence in U candidate frequency domain root sequences, based on the first differential sequence set, where in a differential sequence cross correlation value set corresponding to a $u^{th}$ candidate frequency domain root sequence in the U candidate frequency domain root sequences, an $l^{th}$ first cross correlation value is a first cross correlation value between an h sequence in the first differential sequence set and an $l^{th}$ sequence in a second differential sequence set corresponding to the $u^{th}$ candidate frequency domain root sequence, l=1, 2, ..., L, the second differential sequence set corresponding to the $u^{th}$ candidate frequency domain root sequence is a sequence set obtained by differentiating the $u^{th}$ candidate frequency domain root sequence based on the L granularities, a differentiation granularity corresponding to the $l^{th}$ sequence in the first differential sequence set is the same as that corresponding to the $l^{th}$ sequence in the second differential sequence set corresponding to the $u^{th}$ candidate frequency domain root sequence, u=1, 2, ..., U, and U is a positive integer.

The processing module is further configured to determine K candidate frequency domain root sequences in the U candidate frequency domain root sequences based on differential sequence cross correlation value sets corresponding to the U candidate frequency domain root sequences, where K is an integer less than U.

The processing module is further configured to determine a candidate frequency domain root sequence and a time domain cyclic shift value that correspond to the first sequence, based on the first sequence and the K candidate frequency domain root sequences.

In a possible implementation, the $u^{th}$ candidate root sequence is a ZC sequence, a truncated sequence of the ZC sequence, or a cyclic extended sequence of the ZC sequence, or the $u^{th}$ candidate frequency domain root sequence satisfies the following relationship:

$$S_u(n) = \alpha e^{-j2\pi \left( \frac{u_1 \times ((n \bmod P) - u_2)^3 + \beta n}{P} + \varphi \right)};$$

where n=0, 1, 2, ..., N−1. N represents a length of the $u^{th}$ frequency domain root sequence, $S_u(n)$ represents an $n^{th}$ element of the $u^{th}$ frequency domain root sequence, a is a non-zero complex number, φ is a real number, P is a real number, j represents an imaginary number symbol in a complex number, mod represents a modulo operation, $u_1$ and $u_2$ represent root indexes of the $u^{th}$ frequency domain root sequence, a value range of $U_1$ is positive integers less than or equal to P−1, a value range of $u_2$ is natural numbers less than or equal to P−1, and P is a prime number.

In a possible implementation, the $l^{th}$ sequence in the first differential sequence set satisfies the following relationship:

$$d_l(n) = r(n) \times r((n+l) \bmod N)^*;$$

where n=0, 1, 2, ..., N−1, or n=0, 1, 2, ..., N−1−l, $d_l(n)$ represents an $n^{th}$ element of the $l^{th}$ sequence in the first differential sequence, or represents a conjugate of the $n^{th}$ element of the $l^{th}$ sequence in the first differential sequence, r(n) represents an $n^{th}$ element of the first sequence, l represents a differentiation granularity, l∈{1, 2, ..., L}, and mod represents a modulo operation.

In a possible implementation, the $l^{th}$ sequence in the second differential sequence set corresponding to the $u^{th}$ candidate frequency domain root sequence satisfies the following relationship:

$$c_{u,l}(n) = S_u(n) \times S_u((n+l) \bmod N)^*;$$

where n=0, 1, 2, ..., N−1, or n=0, 1, 2, ..., N−1−l, $c_{u,l}(n)$ represents an $n^{th}$ element of the $l^{th}$ sequence in the second differential sequence set corresponding to the $u^{th}$ candidate frequency domain root sequence, or represents a conjugate of the $n^{th}$ element of the $l^{th}$ sequence in the second differential sequence set corresponding to the $u^{th}$ candidate frequency domain root sequence, $S_u(n)$ represents an $n^{th}$ element of the $u^{th}$ candidate frequency domain root sequence, u∈{1, 2, ..., U}, l represents a differentiation granularity, l∈{1, 2, ..., L}, and mod represents a modulo operation.

In a possible implementation, the processing module is configured to determine the K candidate frequency domain root sequences in the U candidate frequency domain root sequences based on the differential sequence cross correlation value sets corresponding to the U candidate frequency domain root sequences in the following manner:
    obtaining a cross correlation coefficient corresponding to each candidate frequency domain root sequence, based on the differential sequence cross correlation value set corresponding to each candidate frequency domain root sequence in the U candidate frequency domain root sequences; and
    determining the K candidate frequency domain root sequences in the U candidate frequency domain root sequences based on U cross correlation coefficients.

In a possible implementation,
    a cross correlation coefficient corresponding to the $u^{th}$ candidate frequency domain root sequence is a sum of L first cross correlation values in the differential sequence cross correlation value set corresponding to the $u^{th}$ candidate frequency domain root sequence;
    a cross correlation coefficient corresponding to the $u^{th}$ candidate frequency domain root sequence is an average value of first cross correlation values in the differential sequence cross correlation value set corresponding to the $u^{th}$ candidate frequency domain root sequence; or
    a cross correlation coefficient corresponding to the $u^{th}$ candidate frequency domain root sequence is a largest value of first cross correlation values in the differential sequence cross correlation value set corresponding to the $u^{th}$ candidate frequency domain root sequence.

In a possible implementation,
    K cross correlation coefficients corresponding to the K candidate frequency domain root sequences are greater than U−K cross correlation coefficients corresponding to U−K candidate frequency domain root sequences; or
    K cross correlation coefficients corresponding to the K candidate frequency domain root sequences are greater than a first threshold.

In a possible implementation, the processing module is configured to determine the candidate frequency domain root sequence and the time domain cyclic shift value that correspond to the first sequence, based on the first sequence and the K candidate frequency domain root sequences in the following manner:
    obtaining a second cross correlation value between the first sequence and a time domain cyclic shift sequence that corresponds to each candidate frequency domain root sequence in the K candidate frequency domain root sequences; and determining the candidate frequency domain root sequence and the time domain cyclic shift value that correspond to the first sequence, based on the second cross correlation value.

For technical effects brought by the third aspect or the implementations of the third aspect, refer to the description of the technical effects brought by the first aspect or the corresponding implementations of the first aspect.

According to a fourth aspect, a communications apparatus is provided. For example, the communications apparatus is the second communications apparatus described above. The second communications apparatus is configured to perform the method according to any one of the second aspect and the possible implementations. Specifically, the second communications apparatus may include modules configured to perform the method according to any one of the second aspect and the possible implementations, for example, include a processing module and a transceiver module. For example, the transceiver module may include a sending module and a receiving module. The sending module and the receiving module may be different functional modules, and implement sending and receiving functions respectively, or may be a same functional module, and the functional module can implement receiving and sending functions. For example, the second communications apparatus is a communications device, or is a chip or another component disposed in the communications device. For example, the communications device is a network device. The following uses an example in which the second communications apparatus is a network device. For example, the transceiver module may be alternatively implemented as a transceiver, and the processing module may be alternatively implemented as a processor. Alternatively, the sending module may be implemented by using a transmitter, the receiving module may be implemented by using a receiver, the transmitter and the receiver may be different functional modules, or may be a same functional module. If the second communications apparatus is a communications device, the transceiver is implemented as, for example, an antenna, a feeder, and a codec in the communications device. Alternatively, if the second communications apparatus is a chip disposed in the communications device, the transceiver (or the transmitter and the receiver) is, for example, a communications interface in the chip, and the communications interface is connected to a radio frequency transceiver component in the communications device, to implement information receiving and sending via the radio frequency transceiver component. In a description process of the fourth aspect, description is provided still by using an example in which the second communications apparatus is a network device, and the second communications apparatus includes the processing module and the transceiver module.

The transceiver module is configured to receive a first sequence carried on a plurality of subcarriers.

The processing module is configured to convert the first sequence from frequency domain to time domain, to obtain a second sequence.

The processing module is further configured to differentiate the second sequence based on L granularities, to obtain a first differential sequence set including L sequences, where L is a positive integer.

The processing module is further configured to obtain a differential sequence cross correlation value set corresponding to each basic time domain sequence in U basic time domain sequences, based on the first differential sequence set, where in a differential sequence cross correlation value set corresponding to a $u^{th}$ basic time domain sequence in the U basic time domain sequences, an $l^{th}$ first cross correlation value is a first cross correlation value between an $l^{th}$ sequence in the first differential sequence set and an sequence in a second differential sequence set corresponding to the $u^{th}$ basic time domain sequence, l=1, 2, . . . , L, the second differential sequence set corresponding to the $u^{th}$ basic time domain sequence is a sequence set obtained by differentiating the $u^{th}$ basic time domain sequence based on the L granularities, a differentiation granularity corresponding to the $l^{th}$ sequence in the first differential sequence set is the same as that corresponding to the $l^{th}$ sequence in the second differential sequence set corresponding to the $u^{th}$ basic time domain sequence, u=1, 2, . . . , U. and U is a positive integer.

The processing module is further configured to determine K basic time domain sequences in the U basic time domain sequences based on differential sequence cross correlation value sets corresponding to the U basic time domain sequences, where K is an integer less than U.

The processing module is further configured to determine a basic time domain sequence and a frequency domain cyclic shift value that correspond to the second sequence, based on the second sequence and the K basic time domain sequences.

In a possible implementation, the $u^{th}$ basic time domain sequence satisfies the following relationship:

$$x_u(n) = \alpha e^{j2\pi\left(\frac{u_1((n+m) \bmod P)^3}{P} + \varphi\right)}$$

where n=0, 1, 2, . . . , N−1, N represents a length of the $u^{th}$ basic time domain sequence, $x_u(n)$ represents an $n^{th}$ element of the $u^{th}$ basic time domain sequence, a is a non-zero complex number, p is a real number, j represents an imaginary number symbol in a complex number, mod represents a modulo operation, $u_1$ represents an index of the basic time domain sequence, a value range of $u_1$ is positive integers less than or equal to P−1, m represents a time domain cyclic shift value of the basic time domain sequence, a value range of m is natural numbers less than or equal to P−1, and P is a prime number.

In a possible implementation, the $l^{th}$ sequence in the first differential sequence set satisfies the following relationship:

$f_l(n)=t(n)\times t((n+l) \bmod N)^*$;

where n=0, 1, 2, . . . , N−1, or n=0, 1, 2, . . . , N−1−l, $f_l(n)$ represents an $n^{th}$ element of the $l^{th}$ sequence in the first differential sequence set, or represents a conjugate of the $n^{th}$ element of the $l^{th}$ sequence in the first differential sequence set, t(n) represents an $n^{th}$ element of the second sequence, l represents a differentiation granularity, l∈{1, 2, . . . , L}, and mod represents a modulo operation.

In a possible implementation, the $l^{th}$ sequence in the second differential sequence set corresponding to the $u^{th}$ basic time domain sequence satisfies the following relationship:

$g_{u,l}(n)=x_u(n)\times x_u((n+l) \bmod N)^*$;

where n=0, 1, 2, . . . , N−1, or n=0, 1, 2, . . . , N−1−l, $g_{u,l}(n)$ represents an $n^{th}$ element of the $l^{th}$ sequence in the second differential sequence set corresponding to the $u^{th}$ basic time domain sequence, or represents a conjugate of the $n^{th}$ element of the $l^{th}$ sequence in the second differential sequence set corresponding to the $u^{th}$ basic time domain sequence, $x_u(n)$ represents an $n^{th}$ element of the $u^{th}$ basic time domain sequence, u∈{1, 2, . . . , U}, l represents a differentiation granularity, l∈{1, 2, . . . , L}, and mod represents a modulo operation.

In a possible implementation, the processing module is configured to determine the K basic time domain sequences in the U basic time domain sequences based on differential sequence cross correlation value sets corresponding to the U basic time domain sequences in the following manner:
  obtaining a cross correlation coefficient corresponding to each basic time domain sequence, based on the differential sequence cross correlation value set corresponding to each basic time domain sequence in the U basic time domain sequences; and
  determining the K basic time domain sequences in the U basic time domain sequences based on U cross correlation coefficients.

In a possible implementation,
  a cross correlation coefficient corresponding to the $u^{th}$ basic time domain sequence is a sum of L first cross correlation values in the differential sequence cross correlation value set corresponding to the $u^1$ basic time domain sequence;
  a cross correlation coefficient corresponding to the $u^{th}$ basic time domain sequence is an average value of L cross correlation values in the differential sequence cross correlation value set corresponding to the $u^{th}$ basic time domain sequence; or
  a cross correlation coefficient corresponding to the $u^{th}$ basic time domain sequence is a largest value of L cross correlation values in the differential sequence cross correlation value set corresponding to the $u^{th}$ basic time domain sequence.

In a possible implementation,
  K cross correlation coefficients corresponding to the K basic time domain sequences are greater than U−K cross correlation coefficients corresponding to U−K basic time domain sequences; or
  K cross correlation coefficients corresponding to the K basic time domain sequences are greater than a first threshold.

In a possible implementation, the processing module is configured to determine the basic time domain sequence and the frequency domain cyclic shift value that correspond to the second sequence, based on the second sequence and the K basic time domain sequences in the following manner:
  obtaining a second cross correlation value between the second sequence and a frequency domain cyclic shift sequence that corresponds to each basic time domain sequence in the K basic time domain sequences; and
  determining the basic time domain sequence and the frequency domain cyclic shift value that correspond to the second sequence, based on the second cross correlation value.

For technical effects brought by the fourth aspect or the implementations of the fourth aspect, refer to the description of the technical effects brought by the second aspect or the corresponding implementations of the second aspect.

According to a fifth aspect, a communications apparatus is provided. For example, the communications apparatus is the first communications apparatus described above. The communications apparatus includes a processor. Optionally, the communications apparatus may further include a memory, configured to store computer instructions. The processor and the memory are coupled to each other, to implement the method according to any one of the first aspect and the possible implementations. Alternatively, the first communications apparatus may not include a memory, and the memory may be located outside the first communications apparatus. Optionally, the first communications apparatus may further include a communications interface, configured to communicate with another apparatus or device. The processor, the memory, and the communications interface are coupled to each other, to implement the method according to any one of the first aspect and the possible implementations. For example, when the processor executes the computer instructions stored in the memory, the first communications apparatus is enabled to perform the method according to any one of the first aspect and the possible implementations. For example, the first communications apparatus is a communications device, or is a chip or another component disposed in the communications device. For example, the communications device is a network device.

If the first communications apparatus is a communications device, the communications interface is implemented as, for example, a transceiver (or a transmitter and a receiver) in the communications device, and the transceiver is implemented as, for example, an antenna, a feeder, and a codec in the communications device. Alternatively, if the first communications apparatus is a chip disposed in the communications device, the communications interface is, for example, an input/output interface such as an input/output pin of the chip, and the communications interface is connected to a radio frequency transceiver component in the communications device, to implement information receiving and sending via the radio frequency transceiver component.

According to a sixth aspect, a communications apparatus is provided. For example, the communications apparatus is the second communications apparatus described above. The communications apparatus includes a processor. Optionally, the communications apparatus may further include a memory, configured to store computer instructions. The processor and the memory are coupled to each other, to implement the method according to any one of the second aspect and the possible implementations. Alternatively, the second communications apparatus may not include a memory, and the memory may be located outside the second communications apparatus. Optionally, the second communications apparatus may further include a communications interface, configured to communicate with another apparatus or device. The processor, the memory, and the communications interface are coupled to each other, to implement the method according to any one of the second aspect and the possible implementations. For example, when the processor executes the computer instructions stored in the memory, the second communications apparatus is enabled to perform the method according to any one of the second aspect and the possible implementations. For example, the second communications apparatus is a communications device, or is a chip or another component disposed in the communications device. For example, the communications device is a network device.

If the second communications apparatus is a communications device, the communications interface is implemented as, for example, a transceiver (or a transmitter and a receiver) in the communications device, and the transceiver is implemented as, for example, an antenna, a feeder, and a codec in the communications device. Alternatively, if the second communications apparatus is a chip disposed in the communications device, the communications interface is, for example, an input/output interface such as an input/output pin of the chip, and the communications interface is connected to a radio frequency transceiver component in the communications device, to implement information receiving and sending via the radio frequency transceiver component.

According to a seventh aspect, a communications system is provided. The communications system includes the communications apparatus in the third aspect or the communications apparatus in the fifth aspect.

According to an eighth aspect, a communications system is provided. The communications system includes the communications apparatus in the fourth aspect or the communications apparatus in the sixth aspect.

The communications system in the seventh aspect and the communications system in the eighth aspect may be a same communications system, or may be different communications systems. For example, when the communications system in the seventh aspect and the communications system in the eighth aspect are a same communications system, the communications apparatus in the third aspect or the communications apparatus in the fifth aspect and the communications apparatus in the fourth aspect or the communications apparatus in the sixth aspect may be a same communications apparatus, or may be different communications apparatuses in a same communications system. In another example, when the communications system in the seventh aspect and the communications system in the eighth aspect are different communications systems, the communications apparatus in the third aspect or the communications apparatus in the fifth aspect and the communications apparatus in the fourth aspect or the communications apparatus in the sixth aspect may be different communications apparatuses in different communications systems.

According to a ninth aspect, a computer-readable storage medium is provided. The computer-readable storage medium is configured to store computer instructions. When the computer instructions are run on a computer, the computer is enabled to perform the method according to any one of the first aspect and the possible implementations.

According to a tenth aspect, a computer-readable storage medium is provided. The computer-readable storage medium is configured to store computer instructions. When the computer instructions are run on a computer, the computer is enabled to perform the method according to any one of the second aspect and the possible implementations.

According to an eleventh aspect, a computer program product including instructions is provided. The computer program product is configured to store computer instructions. When the computer instructions are run on a computer, the computer is enabled to perform the method according to any one of the first aspect and the possible implementations.

According to a twelfth aspect, a computer program product including instructions is provided. The computer program product is configured to store computer instructions. When the computer instructions are run on a computer, the computer is enabled to perform the method according to any one of the second aspect and the possible implementations.

In embodiments of this application, for example, there are U candidate frequency domain root sequences. In this case, a current calculation amount is calculation of $U*C_s$ cross correlation values. In embodiments of this application, a calculation amount is calculation of only $L*U+K*C_s$. If K is less than U, the calculation amount required in this embodiment of this application is far less than the calculation amount required for current sequence detection. Therefore, the technical solution in embodiments of this application can greatly reduce detection complexity of the network device, and improve detection efficiency of the network device.

DESCRIPTION OF EMBODIMENTS

Figure 1:
FIG. 1 is a schematic diagram of adding a CP to a RACH sequence.

To make objectives, technical solution, and advantages of embodiments of this application clearer, the following further describes embodiments of this application in detail with reference to the accompanying drawings.

The following describes some terms in embodiments of this application to facilitate understanding of a person skilled in the art.

(1) Terminal device: A terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (radio access network, RAN), and exchange a voice or data with the RAN, or exchange a voice and data with the RAN. The terminal device may include user equipment (user equipment, UE), a wireless terminal device, a mobile terminal device, a device-to-device (device-to-device, D2D) communications terminal device, a vehicle-to-everything (vehicle-to-everything, V2X) terminal device, a machine-to-machine/machine-type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant. PDA). The terminal device alternatively includes a limited device, for example, a device having low power consumption, a device having a limited storage capability, or a device having a limited computing capability. For example, the terminal device includes an information sensing device such as a barcode, radio frequency identification (radio frequency identification, RFID), a sensor, a global positioning system (global positioning system. GPS), or a laser scanner.

By way of example, and not limitation, in embodiments of this application, the terminal device may be alternatively a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn by a user or integrated into clothes or an accessory of the user. The wearable device is not only a hardware device, but also implements a powerful function through software support, data exchange, and cloud interaction. Broadly, wearable intelligent devices include full-featured and large-sized devices that can implement all or some functions without depending on smartphones, for example, smart watches or smart glasses, and include devices that focus only on one type of application functions and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (on-board units, OBUs).

In embodiments of this application, the terminal device may further include a relay (relay). Alternatively, it may be understood that any device that can perform data communications with a base station may be considered as a terminal device.

In embodiments of this application, an apparatus configured to implement a function of a terminal device may be a terminal device, or may be an apparatus, for example, a chip system, that can support the terminal device in implementing the function. The apparatus may be installed in the terminal device. In embodiments of this application, the chip system may include a chip, or may include a chip and another discrete component. In the technical solution provided in embodiments of this application, an example in which an apparatus configured to implement a function of a terminal is a terminal device is used to describe the technical solution provided in embodiments of this application.

(2) Network device: A network device includes, for example, an access network (access network, AN) device such as a base station (for example, an access point), and may be a device that communicates with a wireless terminal device through an air interface in one or more cells in an access network. Alternatively, the network device is, for example, a road side unit (road side unit, RSU) in a vehicle-to-everything (vehicle-to-everything, V2X) technology. The base station may be configured to perform mutual conversion between a received over-the-air frame and an IP packet, to serve as a router between the terminal device and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an LTE system or an evolved NodeB (NodeB, eNB, or e-NodeB, evolved NodeB) in a long term evolution-advanced (long term evolution-advanced, LTE-A) system, may include a next generation NodeB (next generation NodeB, gNB) in a 5G NR system (also briefly referred to as an NR system), or may include a centralized unit (centralized unit, CU) and a distributed unit (distributed unit, DU) in a cloud radio access network (cloud radio access network, Cloud RAN) system. This is not limited in embodiments of this application.

The network device may further include a core network device. Because embodiments of this application mainly relate to an access network, the network device is an access network device in the following description unless otherwise specified.

In embodiments of this application, an apparatus configured to implement a function of a network device may be a network device, or may be an apparatus, for example, a chip system, that can support the network device in implementing the function. The apparatus may be installed in the network device. In the technical solution provided in embodiments of this application, an example in which an apparatus configured to implement a function of a network device is a network device is used to describe the technical solution provided in embodiments of this application.

(3) Terms "system" and "network" may be used interchangeably in embodiments of this application. In addition, "at least one" means one or more, and "a plurality of" means two or more. A term "and/or" describes an association relationship between associated objects and represents that three relationships may exist. For example, A and/or B may represent the following three cases: Only A exists, both A and B exist, and only B exists, where A and B may be singular or plural. The character "/" usually indicates an "or" relationship between the associated objects. The term "at least one (piece) of the following" or a similar expression thereof means any combination of these items, including any combination of one (piece) or a plurality (pieces). For example, at least one (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, but are not intended to limit an order, a time sequence, priorities, or importance of the plurality of objects. For example, a first sequence and a second sequence are merely used to distinguish different sequences, but do not indicate a difference in content, a sending sequence, a priority, an importance degree, or the like between the two sequences.

The foregoing describes some noun concepts used in embodiments of this application. The following describes technical features of embodiments of this application.

Distances between different terminal devices and the base station are different. Therefore, when there is no uplink TA, signals of different terminal devices reach the base station at different times. Generally, a longer distance from the terminal device to the base station indicates a larger propagation delay of a signal, and a later time of arrival at the base station. A RACH is an uplink channel in a wireless communications system, and may be used to estimate a propagation delay of the uplink signal. The uplink TA of the terminal device may be determined by using the propagation delay. The terminal device may adjust a transmit time of the uplink signal based on the uplink TA. For a terminal device with a larger propagation delay, the corresponding uplink TA is larger, to be specific, the transmit time needs to be earlier. In this way, it can be ensured that signals of all terminal devices reach the base station at a basically same time.

When transmitting a RACH sequence, because the terminal device has not learned of the uplink TA, RACH sequences transmitted by different terminal devices reach the base station at different times. To resolve the problem that the RACH sequences reach the base station at different times, a cyclic prefix (cyclic prefix, CP) is further added to the RACH sequence sent by the terminal device. FIG. 1 is a schematic diagram of adding a CP to a RACH sequence.

Currently, a ZC (Zadoff-Chu) sequence, for example, a ZC sequence with a length of 139 or a ZC sequence with a length of 839 is usually used as a RACH sequence. A ZC sequence with a length of N has a total of N−1 different root sequences (root sequences). A same root sequence may generate a plurality of time domain cyclic shift sequences (namely, RACH sequences) by using a time domain cyclic shift value. One cell has a plurality of RACH sequences, for use by a terminal device in the cell.

When a quantity of connected terminal devices is relatively large, a quantity of RACH sequences may be insufficient for use. Therefore, the RACH sequences may be supplemented by using Alltop sequences, so that each cell may be allocated with more RACH sequences. The Alltop sequences include ZC sequences. In other words, if a quantity of ZC sequences is insufficient to meet a requirement, the Alltop sequences may be used as the RACH sequences. An Alltop sequence with a length of N has a total of N(N−1) different root sequences. A same root sequence may generate a plurality of time domain cyclic shift sequences (namely, RACH sequences) by using a time domain cyclic shift value.

The base station serving as a receive end of the RACH sequence needs to detect whether all RACH sequences configured in this cell are sent by the terminal device. Because the base station does not know a distance from the terminal device to the base station, that is, does not know the propagation delay of the RACH sequence, the RACH sequence received by the base station may be obtained by performing time domain cyclic shifting on the RACH sequence sent by the terminal device. Therefore, the base station needs to calculate cross correlation values between the received RACH sequence and all possible time domain cyclic shift sequences of all the RACH sequences of this cell, and determine, based on peaks of the obtained cross correlation values, which RACH sequence the received RACH sequence actually is, to complete detection of the RACH sequence.

A common method for calculating, by the base station, a cross correlation value is as follows:

For example, this cell is configured with U root sequences, which are respectively $s_0(n), s_1(n), \ldots, s_{U-1}(n)$, n=0, 1, 2, . . . , N−1. The base station performs element-by-element conjugate multiplication on the received RACH sequence (r(n), n=0, 1, 2, . . . , N−1) with all root sequences of this cell in frequency domain, to obtain U sequences obtained by performing multiplication. A $u^{th}$ sequence obtained by performing multiplication in the U sequences obtained by performing multiplication is $c_u(n)=r(n)*s_u(n)*$, n=0, 1, 2, . . . , N−1, u=0, 1, 2, . . . , M. Then, the base station performs inverse fast Fourier transform (inverse fast Fourier transform, IFFT) on the U sequences obtained by performing multiplication, to obtain the cross correlation values between the received RACH sequence and all the possible time domain cyclic shift sequences of all the RACH sequences of this cell.

It can be learned that, in this calculation manner, $U*C_s$ cross correlation values need to be calculated, where $C_s$ represents a quantity of sampled time domain cyclic shift values. Calculation complexity is relatively high. For example, the calculation complexity is linearly related to a quantity of root sequences. If the quantity of root sequences is relatively large, a calculation amount is quite large.

In view of this, the technical solution in embodiments of this application is provided. In embodiments of this application, K candidate frequency domain root sequences are first filtered based on a differentiation result of a received first sequence and differentiation results of candidate frequency domain root sequences, and a candidate frequency domain root sequence to which the first sequence actually corresponds only needs to be determined based on the first sequence and the K candidate frequency domain root sequences. For example, there are U candidate frequency domain root sequences. In this case, a current calculation amount is calculation of $U*C_s$ cross correlation values. In this embodiment of this application, a calculation amount is calculation of only $L*U+K*C_s$, where $C_s$ represents a quantity of sampled time domain cyclic shift values, and L represents a quantity of differentiation granularities. If K is less than U, the calculation amount required in this embodiment of this application is far less than the calculation amount required for current sequence detection. Therefore, the technical solution in embodiments of this application can greatly reduce detection complexity of the receive end, and improve detection efficiency of the receive end.

The technical solution provided in embodiments of this application may be applied to a 4th generation (4th generation, 4G) mobile communications technology system, for example, an LTE system; a 5G system, for example, an NR system; or a next-generation mobile communications system or another similar communications system. This is not specifically limited. In addition, embodiments of this application may be further applied to a sidelink (sidelink, SL), for example, may be applied to a D2D scenario, which may be an NR D2D scenario, an LTE D2D scenario, or the like, or may be applied to a V2X scenario, which may be an NR V2X scenario, an LTE V2X scenario, or the like, and for example, may be applied to an Internet of Vehicles, for example, V2X, LTE-V, or V2V, or may be applied to fields such as intelligent driving and intelligent networking of vehicles. Embodiments of this application may be alternatively applied to another scenario or another communications system. This is not specifically limited.

Figure 2:
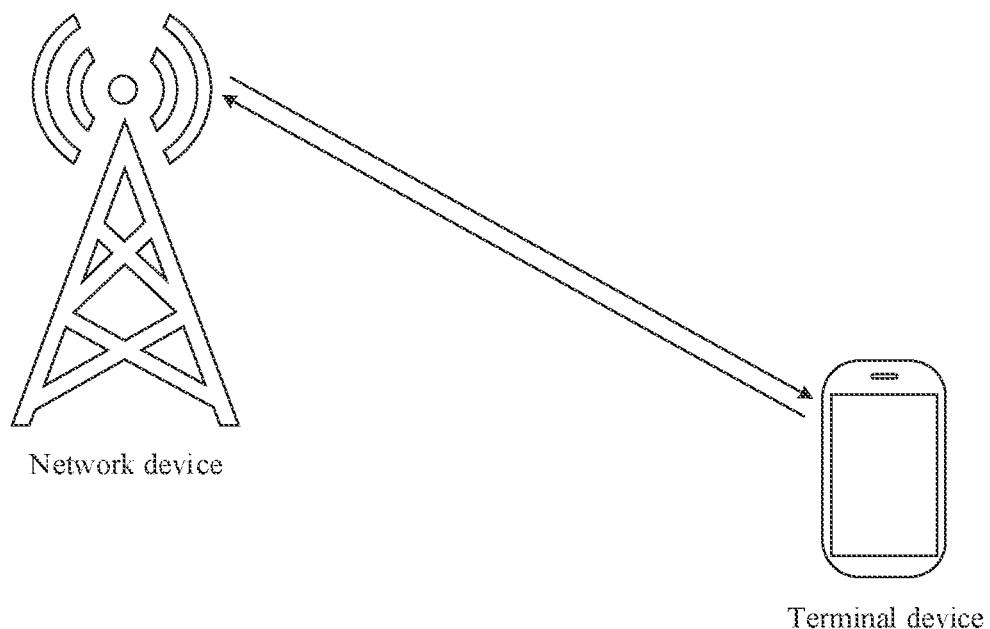
FIG. 2 is a schematic diagram of an application scenario according to an embodiment of this application.

The following describes a network architecture used in embodiments of this application. FIG. 2 shows a network architecture used in embodiments of this application.

FIG. 2 includes a network device and a terminal device. The terminal device may send a RACH sequence or another uplink signal to the network device. The network device may detect the RACH sequence or another uplink signal from the terminal device by using the method provided in embodiments of this application. A quantity of terminal devices in FIG. 2 is merely an example. During actual application, the network device may provide services for a plurality of terminal devices.

The network device in FIG. 2 is, for example, a base station. The network device corresponds to different devices in different systems. For example, the network device may correspond to an eNB in a 4G system, and correspond to a 5G access network device such as a gNB in a 5G system. Certainly, the technical solution provided in embodiments of this application may also be applied to a future mobile communications system. Therefore, the network device in FIG. 2 may also correspond to a network device in the future mobile communications system. In FIG. 2, an example in which the network device is a base station is used. Actually, with reference to the foregoing description, the network device may be alternatively a device such as an RSU. In addition, an example in which the terminal device in FIG. 2 is a mobile phone is used. Actually, based on the foregoing description of the terminal device, it can be learned that the terminal device in embodiments of this application is not limited to the mobile phone.

The following describes the technical solution in embodiments of this application with reference to the accompanying drawings.

Figure 3:
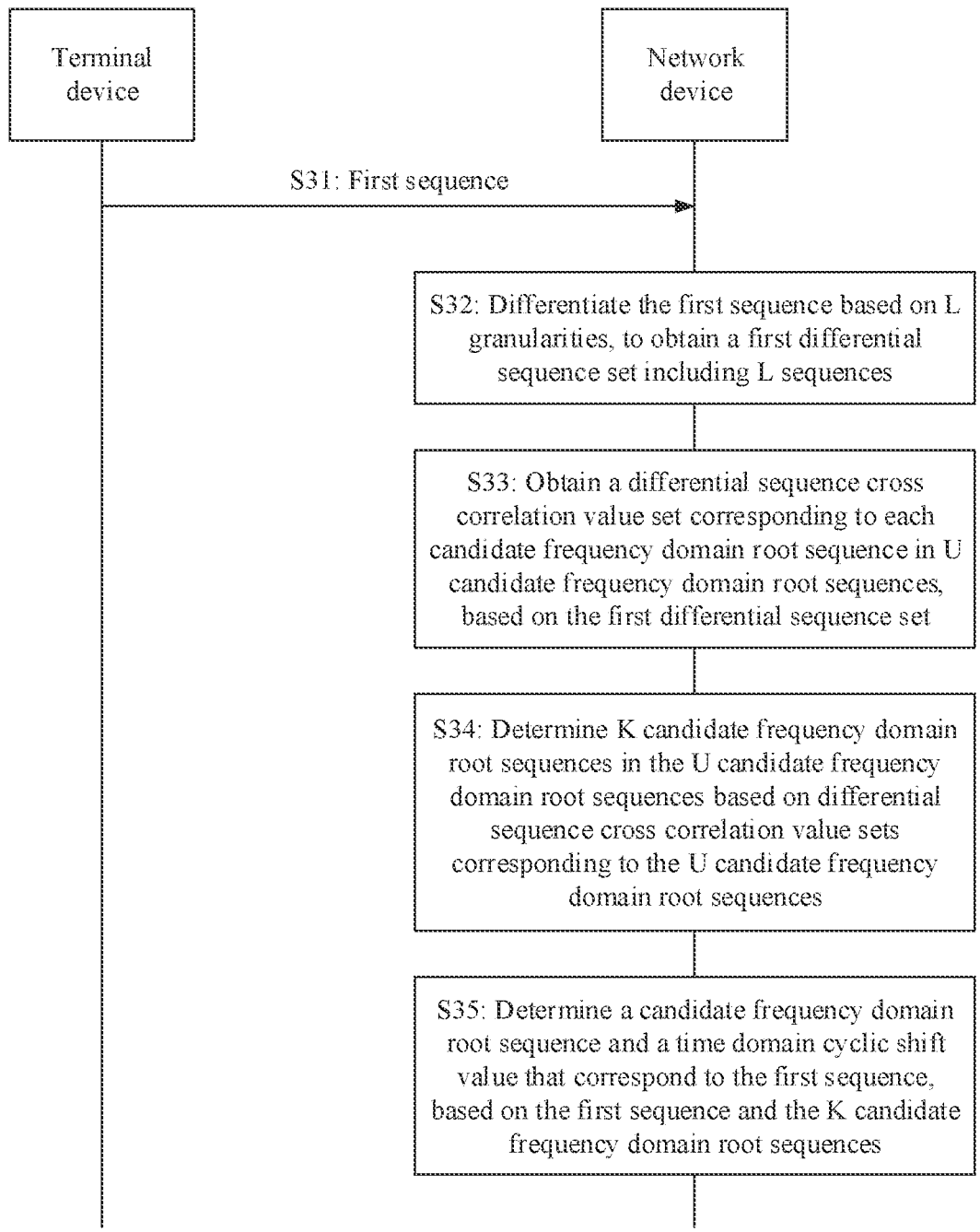
FIG. 3 is a flowchart of a first sequence detection method according to an embodiment of this application.

An embodiment of this application provides a first sequence detection method. FIG. 3 is a flowchart of the method. In the following description, an example in which the method is applied to the network architecture shown in FIG. 2 is used.

For ease of description, an example in which the method is performed by the terminal device and the network device is used below. Because this embodiment uses an example in which this embodiment is applied to the network architecture shown in FIG. 2, the terminal device in the following description may implement the function of the terminal device in the network architecture shown in FIG. 2. The network device in the following description may implement the function of the network device in the network architecture shown in FIG. 2.

S31: The network device receives a first sequence carried on a plurality of subcarriers.

The terminal device may send the sequence on the plurality of subcarriers based on a requirement. Therefore, the first sequence may include a sequence sent by one or more terminal devices (FIG. 3 merely uses one terminal device as an example, but actually, the first sequence may be sent by one terminal device to the network device, or may include sequences sent by a plurality of terminal devices to the network device), or may not include a sequence sent by any terminal device, to be specific, may include only noise.

In this embodiment of this application, the sequence sent by the terminal device, for example, is a RACH sequence. The RACH sequence, for example, is a ZC sequence or an Alltop sequence. Alternatively, the sequence sent by the terminal device may be another sequence.

S32: The network device differentiates the first sequence based on L granularities, to obtain a first differential sequence set including L sequences, where L is a positive integer.

For example, an $n^{th}$ element of the first sequence may be denoted as r(n), where n=0, 1, 2, . . . . N. The network device differentiates the first sequence based on the L granularities, so that the L sequences can be obtained. For example, the L sequences may also be referred to as L first differential sequences. For example, the L first differential sequences belong to the first differential sequence set. The first differential sequence set may actually exist. To be specific, the network device places the L first differential sequences into one set, and the set is the first differential sequence set. Alternatively, the first differential sequence set may not exist. The network device merely obtains the L first differential sequences, and does not place the L first differential sequences into one set.

The first sequence is differentiated based on the differentiation granularity l. For example, in one manner, the $n^{th}$ element of the first sequence is multiplied by a conjugate of an $(n-l)^{th}$ element, to obtain a new sequence, namely, a first differential sequence in the L first differential sequences. For example, an $l^{th}$ first differential sequence in the first differential sequence set may satisfy the following relationship:

$$d_l(n) = r(n) \times r((n+l) \bmod N)^* \quad \text{(formula 1)}$$

where n=0, 1, 2, . . . , N−1, or n=0, 1, 2, . . . , N−1−1. $d_l(n)$ represents an $n^{th}$ element of the $l^{th}$ first differential sequence in the first differential sequence set, or represents a conjugate of the $n^{th}$ element of the $l^{th}$ first differential sequence in the first differential sequence set. r(n) represents an $n^{th}$ element of the first sequence. l represents a differentiation granularity, where l∈{1, 2, . . . , L}. mod represents a modulo operation. r((n+l)mod N)* represents a conjugate of (r(n+l) mod N).

For example, L=2, and l may be separately 1 and 2. In this case, the network device differentiates the first sequence based on the differentiation granularity 1, to obtain one first differential sequence. The first differential sequence may satisfy $d_l(n) = r(n) \times r((n+1) \bmod N)^*$. In addition, the network device differentiates the first sequence based on the differentiation granularity 2, to obtain another first differential sequence. The first differential sequence may satisfy $d_l(n) = r(n) \times r((n+2) \bmod N)^*$.

S33: The network device may obtain a differential sequence cross correlation value set corresponding to each candidate frequency domain root sequence in the U candidate frequency domain root sequences, based on the first differential sequence set.

The U candidate frequency domain root sequences, for example, are all ZC sequences, or all Alltop sequences, or some frequency domain root sequences in the U candidate frequency domain root sequences are ZC sequences, and remaining frequency domain root sequences in the U candidate frequency domain root sequences are Alltop sequences. For example, types of the U candidate frequency domain root sequences are all the same. For example, the U candidate frequency domain root sequences are all ZC sequences, or truncated sequences of the ZC sequences, or cyclic extended sequences of the ZC sequences, or all satisfy the foregoing relationship. Alternatively, the types of the U candidate frequency domain root sequences may be different. For example, in the U candidate frequency domain root sequences, some candidate frequency domain root sequences are ZC sequences, some frequency domain root sequences satisfy the foregoing relationship, or some frequency domain root sequences are cyclic extended sequences of ZC sequences.

For example, the $u^{th}$ candidate root sequence in the U candidate frequency domain root sequences is a ZC sequence, a truncated sequence of the ZC sequence, or a cyclic extended sequence of the ZC sequence, or the $u^{th}$ candidate frequency domain root sequence may satisfy the following relationship:

$$S_u(n) = \alpha e^{-j2\pi\left(\frac{u_1 \times ((n \bmod P) - u_2)^3 + \beta n}{P} + \varphi\right)} \quad \text{(formula 2)}$$

where n=0, 1, 2, . . . . N−1, N represents a length of the $u^{th}$ frequency domain root sequence, $S_u(n)$ represents an $n^{th}$ element of the $u^{th}$ frequency domain root sequence, α is a non-zero complex number, φ is a real number, β is a real number, j represents an imaginary number symbol in a complex number, mod represents a modulo operation, $u_1$ and $u_2$ represent root indexes of the $u^{th}$ frequency domain root sequence, a value range of $u_1$ is positive integers less than or equal to P−1, a value range of $u_2$ is natural numbers less than or equal to P−1, and P is a prime number.

Alternatively, if the $u^{th}$ candidate root sequence is a ZC sequence, the ZC sequence may satisfy the following relationship:

$$S(n) = e^{-j2\pi\left(\frac{un(n+1)}{P}\right)} \quad \text{(formula 3)}$$

where u represents a root index.

For the $u^{th}$ candidate frequency domain root sequence in the U candidate frequency domain root sequences, a differential sequence cross correlation value set including L cross correlation values may be obtained. To avoid confusion with other cross correlation values that subsequently appear, the cross correlation values included in the differential sequence cross correlation value set are referred to as first cross correlation values herein. For example, for the $u^{th}$ candidate frequency domain root sequence in the U candidate frequency domain root sequences, a differential sequence cross correlation value set including L first cross correlation values may be obtained. u=1, 2, . . . , U, and U is a positive integer.

For example, an $l^{th}$ first cross correlation value in the differential sequence cross correlation value set corresponding to the $u^{th}$ candidate frequency domain root sequence is a cross correlation value between an $l^{th}$ first differential sequence in the first differential sequence set and an $N^{th}$ sequence in a second differential sequence set corresponding to the $u^{th}$ candidate frequency domain root sequence, where l=1, 2, . . . , L. The second differential sequence set corresponding to the $u^{th}$ candidate frequency domain root sequence is a sequence set obtained by differentiating the $u^{th}$ candidate frequency domain root sequence based on the L granularities, a differentiation granularity corresponding to the $l^{th}$ first differential sequence in the first differential sequence set is the same as that corresponding to the $l^{th}$ sequence in the second differential sequence set corresponding to the $u^{th}$ candidate frequency domain root sequence, u=1, 2, . . . , U, and U is a positive integer.

For example, the network device may differentiate the $u^{th}$ candidate frequency domain root sequence based on the L differentiation granularities, to obtain the second differential sequence set. The second differential sequence set includes L sequences. For example, the L sequences may also be referred to as L second differential sequences. In this case, the second differential sequence set includes the L second differential sequences. The second differential sequence set may actually exist. To be specific, the network device places the L second differential sequences into one set, and the set is the second differential sequence set. Alternatively, the second differential sequence set may not exist. The network device merely obtains the L second differential sequences, and does not place the L second differential sequences into one set.

Since u=1, 2, . . . , U, it indicates that the network device can differentiate all the U candidate frequency domain root sequences based on the L differentiation granularities. For each candidate frequency domain root sequence in the U candidate frequency domain root sequences, a corresponding second differential sequence set can be obtained. The U candidate frequency domain root sequences may include all candidate frequency domain root sequences of a first cell, or include some candidate frequency domain root sequences of the first cell. The first cell is a cell used by the network device to receive the first sequence.

For example, the $l^{th}$ second differential sequence in the second differential sequence set corresponding to the $u^{th}$ candidate frequency domain root sequence may satisfy the following relationship:

$$c_{u,l}(n)=S_u(n) \times S_u((n+l) \bmod N)^* \quad \text{(formula 4)}$$

where n=0, 1, 2, . . . , N−1, or n=0, 1, 2, . . . . N−1−l. $c_{u,l}(n)$ represents an $n^{th}$ element of the $l^{th}$ second differential sequence in the second differential sequence set corresponding to the $u^{th}$ candidate frequency domain root sequence, or represents a conjugate of the $n^{th}$ element of the $l^{th}$ sequence in the second differential sequence set corresponding to the $u^{th}$ candidate frequency domain root sequence. $S_u(n)$ represents an $n^{th}$ element of the $u^{th}$ candidate frequency domain root sequence, where u∈{1, 2, . . . , U}. l represents a differentiation granularity, where l∈{1, 2, . . . , L}.

For example, L=2, and l may be separately 1 and 2. In this case, the network device differentiates the $u^{th}$ candidate frequency domain root sequence based on the differentiation granularity 1, to obtain one second differential sequence. The second differential sequence may satisfy $c_{u,l}(n)=S_u(n) \times S_u((n+1) \bmod N)^*$. In addition, the network device differentiates the $u^{th}$ candidate frequency domain root sequence based on the differentiation granularity 2, to obtain one second differential sequence. The second differential sequence may satisfy $c_{u,l}(n)=S_u(n) \times S_u((n+2) \bmod N)^*$.

When differentiating the first sequence and the $u^{th}$ candidate frequency domain root sequence, the network device uses the same L differentiation granularities. Therefore, from the perspective of the differentiation granularity, the differentiation result of the first sequence (namely, the obtained L first differential sequences) and the differentiation result of the $u^{th}$ candidate frequency domain root sequence (namely, the obtained L second differential sequences) may be in one-to-one correspondence with each other, or in other words, the L first differential sequences in the first differential sequence set and the L second differential sequences in the second differential sequence set may be in one-to-one correspondence with each other. Correspondence herein means that differentiation granularities are the same. For example, in the L first differential sequences, there is one first differential sequence with a differentiation granularity of 1, and in the L second differential sequences, there is also one second differential sequence with a differentiation granularity of 1. In this case, the first differential sequence corresponds to the second differential sequence. In another example, in the L first differential sequences, there is one first differential sequence with a differentiation granularity of 2, and in the L second differential sequences, there is also one second differential sequence with a differentiation granularity of 2. In this case, the first differential sequence corresponds to the second differential sequence.

If L=1, a calculation manner is relatively simple. The first differential sequence set only needs to include one first differential sequence, and the second differential sequence set only needs to include one second differential sequence, so that a calculation amount can be reduced. However, if the network device simultaneously receives sequences from two terminal devices, the first sequence is obtained by superimposing the two sequences and noise, and the two sequences are obtained by using different time domain cyclic shift values for a same candidate frequency domain root sequence, a difference between the time domain cyclic shift values of the two sequences may be a half of a maximum time domain cyclic shift value. If L=1, the first sequence is differentiated. A result obtained by performing differentiation may be that the two sequences cancel each other out.

Consequently, the network device cannot determine, by using a differential sequence cross correlation value, whether the two sequences are sent. In other words, the network device cannot detect any one of the two sequences. Therefore, in this embodiment of this application, L may be alternatively greater than 1. Because a plurality of differentiation granularities are used when the first sequence is differentiated, even though differentiation results of different sequences cancel each other out in the case of one differentiation granularity, normal sequences after differentiation are still obtained in the case of other differentiation results. In this case, even though the first sequence simultaneously received by the network device includes sequences from two or more terminal devices, a detection result can be normally obtained, so that the network device detects the first sequence more accurately.

In this way, the network device may obtain a first cross correlation value between a first differential sequence and a second differential sequence that correspond to each other in the first differential sequence set and the second differential sequence set. To calculate a cross correlation value between two complex sequences, in one calculation manner, element-by-element conjugate multiplication is performed on the two complex sequences, all products are summed up, and then a modulo operation is performed on a result of the summation, to obtain the cross correlation value between the two complex sequences. For example, the network device calculates the first cross correlation value between a pair of first differential sequence and second differential sequence that correspond to each other. Specifically, $d_f(n)$ may be multiplied by $s_u(n) \times s_u((n+1) \bmod N)^*$, all products are summed up, and then a modulo operation is performed on a result of the summation, to obtain the first cross correlation value between the first differential sequence and the second differential sequence.

Because the first differential sequence set includes L first differential sequences, the second differential sequence set corresponding to the $u^{th}$ candidate frequency domain root sequence includes L second differential sequences, and the L first differential sequences are in one-to-one correspondence with the L second differential sequences, this is equivalent to that the network device can obtain L first cross correlation values for the first sequence and the $u^{th}$ candidate frequency domain root sequence. For example, the L first cross correlation values belong to a differential sequence cross correlation value set. The differential sequence cross correlation value set may actually exist. To be specific, the network device places the L first cross correlation values into one set, and the set is the differential sequence cross correlation value set. Alternatively, the differential sequence cross correlation value set may not exist. The network device merely obtains the L first cross correlation values for the $u^{th}$ candidate frequency domain root sequence, and does not place the L first cross correlation values into one set.

For the U candidate frequency domain root sequences, the network device can obtain a total of U×L first cross correlation values. For example, the U×L first cross correlation values may belong to U differential sequence cross correlation value sets.

S34: The network device determines K candidate frequency domain root sequences in the U candidate frequency domain root sequences based on differential sequence cross correlation value sets corresponding to the U candidate frequency domain root sequences. K is an integer less than U.

In other words, the network device may select the K candidate frequency domain root sequences from the U candidate frequency domain root sequences based on the U×L first cross correlation values. A selection manner of the network device is provided herein.

For example, for the $u^{th}$ candidate frequency domain root sequence, the network device may obtain a cross correlation coefficient corresponding to the $u^{th}$ candidate frequency domain root sequence, based on a differential sequence cross correlation value set corresponding to the $u^{th}$ candidate frequency domain root sequence, or in other words, based on L first cross correlation values corresponding to the $u^{th}$ candidate frequency domain root sequence. For the U candidate frequency domain root sequences, the network device may perform a similar operation, to obtain U cross correlation coefficients corresponding to the U candidate frequency domain root sequences.

After obtaining U cross correlation coefficients, the network device may select the K candidate frequency domain root sequences from the U candidate frequency domain root sequences based on the U cross correlation coefficients. For example, the network device may select K cross correlation coefficients with relatively large values from the U cross correlation coefficients, and the K cross correlation coefficients correspond to the K candidate frequency domain root sequences. In other words, the K cross correlation coefficients corresponding to the K candidate frequency domain root sequences are greater than the U−K cross correlation coefficients corresponding to U−K candidate frequency domain root sequences. The U−K candidate frequency domain root sequences are candidate frequency domain root sequences other than the K candidate frequency domain root sequences in the U candidate frequency domain root sequences. Alternatively, the network device may not compare the U cross correlation coefficients with each other, and instead, may compare the U cross correlation coefficients with the first threshold, and select the K candidate frequency domain root sequences w % hose cross correlation coefficients are greater than the first threshold. For example, the first threshold is configured by the network device, or is configured by a core network device, or may be specified by a protocol.

The network device may obtain the cross correlation coefficient corresponding to the $u^{th}$ candidate frequency domain root sequence, based on the differential sequence cross correlation value set corresponding to the $u^{th}$ candidate frequency domain root sequence, or in other words, based on the L first cross correlation values corresponding to the $u^{th}$ candidate frequency domain root sequence. For example, in one manner, the network device adds up the L first cross correlation values corresponding to the $u^{th}$ candidate frequency domain root sequence, and the obtained result is used as the cross correlation coefficient corresponding to the $u^{th}$ candidate frequency domain root sequence, or in other words, the cross correlation coefficient corresponding to the $u^{th}$ candidate frequency domain root sequence is the sum of the L first cross correlation values corresponding to the $u^{th}$ candidate frequency domain root sequence. Alternatively, in another manner, the network device may determine the largest value of the L first cross correlation values corresponding to the $u^{th}$ candidate frequency domain root sequence, and the largest value may be used as the cross correlation coefficient corresponding to the $u^{th}$ candidate frequency domain root sequence, or in other words, the cross correlation coefficient corresponding to the $u^{th}$ candidate frequency domain root sequence is the largest value of the L first cross correlation values corresponding to the $u^{th}$ candidate frequency domain root sequence. Alternatively, in still another manner, the network device may obtain the average value of the L first cross correlation values corresponding to the uh candidate frequency domain root sequence, and the obtained average value is used as the cross correlation coefficient corresponding to the $u^{th}$ candidate frequency domain root sequence, or in other words, the cross correlation coefficient corresponding to the $u^{th}$ candidate frequency domain root sequence is the average value of the L first cross correlation values corresponding to the $u^{th}$ candidate frequency domain root sequence. The average value herein may be an arithmetic average value, or a weighted average value. If the average value is a weighted average value, a weight corresponding to the L first cross correlation values may be configured by the network device, specified by a protocol, or the like. Certainly, only several possibilities are listed herein. A manner of obtaining the cross correlation coefficient corresponding to the candidate frequency domain root sequence by the network device is not limited in this embodiment of this application.

In this embodiment of this application, the K candidate frequency domain root sequences selected by the network device correspond to relatively large cross correlation coefficients. The cross correlation coefficient is correlated with the received first sequence. A larger cross correlation coefficient indicates a higher possibility that the candidate frequency domain root sequence is correlated with the received first sequence. Therefore, the network device may filter candidate frequency domain root sequences with relatively high correlation with the received first sequence, and then determine, from these candidate frequency domain root sequences, a candidate frequency domain root sequence corresponding to the received first sequence, so that a success rate of detecting the first sequence can be ensured to the greatest extent and detection complexity can be reduced.

S35: The network device determines a candidate frequency domain root sequence and a time domain cyclic shift value that correspond to the first sequence, based on the first sequence and the K candidate frequency domain root sequences.

After determining the K candidate frequency domain root sequences, the network device may further determine one or more candidate frequency domain root sequences to which the first sequence actually corresponds in the K candidate frequency domain root sequences.

For example, the network device may determine one or more time domain cyclic shift values corresponding to each candidate frequency domain root sequence in the K candidate frequency domain root sequences, and can obtain a corresponding time domain cyclic shift sequence based on each time domain cyclic shift value corresponding to each candidate frequency domain root sequence. In this way, each candidate frequency domain root sequence in the K candidate frequency domain root sequences may correspond to one or more time domain cyclic shift sequences. The network device may obtain the cross correlation value between the first sequence and each time domain cyclic shift sequence that corresponds to each candidate frequency domain root sequence in the K candidate frequency domain root sequences. For example, the cross correlation value herein is referred to as the second cross correlation value. After obtaining the second cross correlation value between the first sequence and each time domain cyclic shift sequence that corresponds to each candidate frequency domain root sequence in the K candidate frequency domain root sequences, the network device may determine whether the second cross correlation value is greater than a threshold, and a time domain cyclic shift sequence corresponding to the second cross correlation value greater than the threshold is a sequence corresponding to the first sequence. Optionally, before determining whether the second cross correlation value is greater than the threshold, the network device may perform noise normalization on the second cross correlation value, and then determine whether the second cross correlation value is greater than the threshold. A time domain cyclic shift sequence corresponding to a cross correlation value greater than the threshold corresponds to one candidate frequency domain root sequence and corresponds to one time domain cyclic shift value. This is equivalent to determining, by the network device, the candidate frequency domain root sequence and the time domain cyclic shift value that correspond to the first sequence.

After determining the candidate frequency domain root sequence and the time domain cyclic shift value that correspond to the first sequence, for example, the network device may determine whether a terminal device transmits a RACH signal and determine a sequence based on which the transmitted RACH signal is generated, and may further determine a delay of the terminal device based on the time domain cyclic shift value, to determine an uplink TA for the terminal device based on the delay. The network device may notify the terminal device of the determined uplink TA, so that the terminal device can adjust a transmit time of an uplink signal based on the uplink TA. For example, for a terminal device with a larger propagation delay, the uplink TA may be larger, to be specific, the transmit time of the uplink signal is earlier. In this way, it can be ensured to the greatest extent that signals of all terminal devices reach the network device at a basically same time. Alternatively, the network device may further apply the candidate frequency domain root sequence and/or the time domain cyclic shift value for other purposes.

In this embodiment of this application, the K candidate frequency domain root sequences are first filtered based on a differentiation result of the received first sequence and differentiation results of candidate frequency domain root sequences, and a candidate frequency domain root sequence to which the first sequence actually corresponds only needs to be determined based on the first sequence and the K candidate frequency domain root sequences. For example, there are U candidate frequency domain root sequences. In this case, a current calculation amount is calculation of $U*C_s$ cross correlation values. In this embodiment of this application, a calculation amount is calculation of only $L*U+K*C_s$ cross correlation values, where $C_s$ represents a quantity of sampled time domain cyclic shift values (for example, each candidate frequency domain root sequence in the K candidate frequency domain root sequences corresponds to a same quantity of time domain cyclic shift values, and the quantity is $C_s$), and L represents a quantity of differentiation granularities. If K is less than U, the calculation amount required in this embodiment of this application is far less than the calculation amount required for current sequence detection. Therefore, the technical solution in this embodiment of this application can greatly reduce detection complexity of the receive end, and improve detection efficiency of the receive end.

Figure 4:
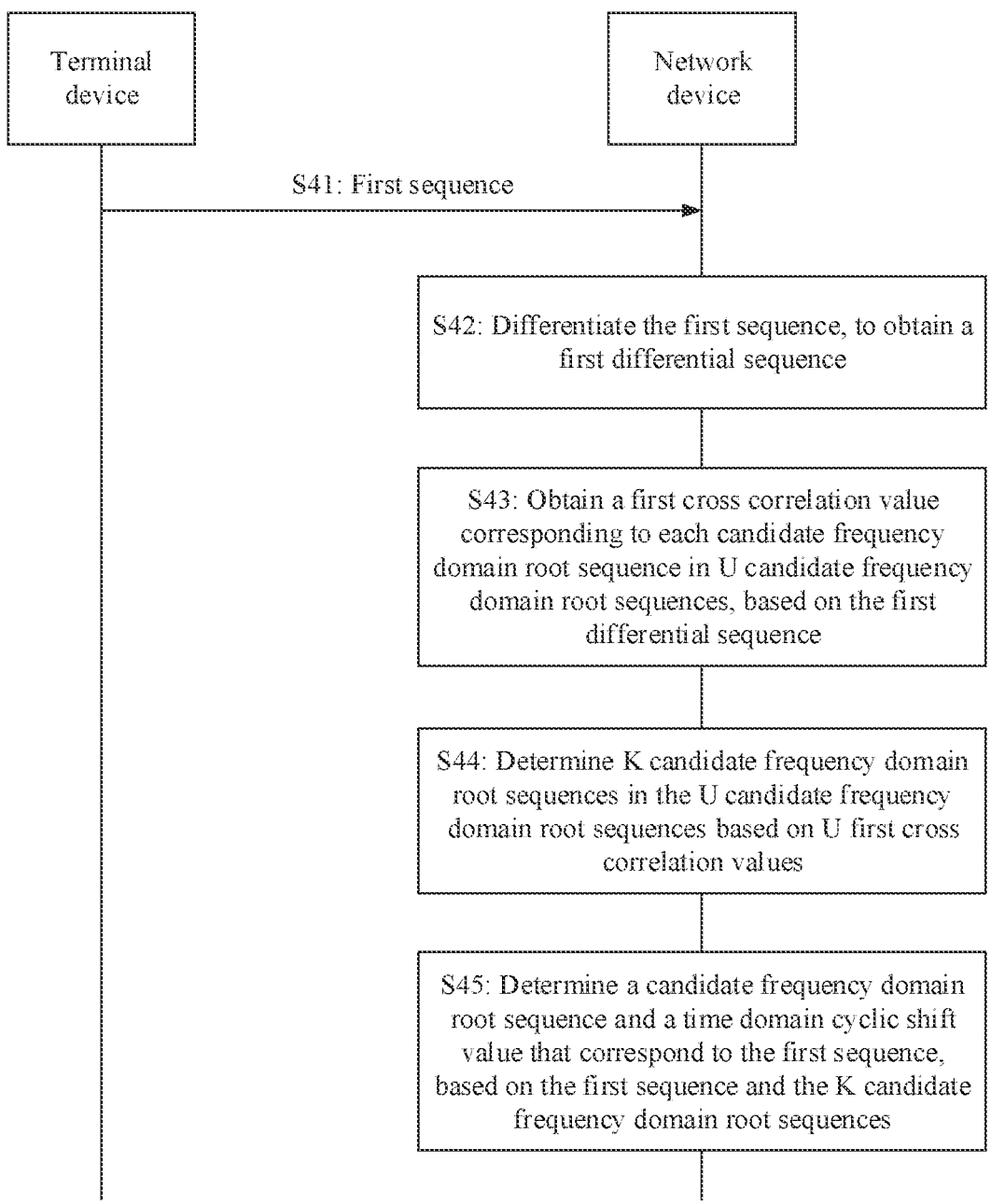
FIG. 4 is a flowchart of a second sequence detection method according to an embodiment of this application.

For the method provided in the embodiment shown in FIG. 3, there is a special case, namely, a case in which L=1. In the following, an embodiment of this application provides a second sequence detection method for describing this case. FIG. 4 is a flowchart of the method. In the following description, an example in which the method is applied to the network architecture shown in FIG. 2 is used.

For ease of description, an example in which the method is performed by the terminal device and the network device is used below. Because this embodiment uses an example in which this embodiment is applied to the network architecture shown in FIG. 2, the terminal device in the following description may implement the function of the terminal device in the network architecture shown in FIG. 2. The network device in the following description may implement the function of the network device in the network architecture shown in FIG. 2.

S41: The network device receives a first sequence carried on a plurality of subcarriers.

The terminal device may send the sequence on the plurality of subcarriers based on a requirement. Therefore, the first sequence may include a sequence sent by one or more terminal devices (FIG. 4 merely uses one terminal device as an example, but actually, the first sequence may be sent by one terminal device to the network device, or may include sequences sent by a plurality of terminal devices to the network device), or may not include a sequence sent by any terminal device, to be specific, may include only noise.

In this embodiment of this application, the sequence sent by the terminal device, for example, is a RACH sequence. The RACH sequence, for example, is a ZC sequence or an Alltop sequence. Alternatively, the sequence sent by the terminal device may be another sequence.

S42: The network device differentiates the first sequence, to obtain a first differential sequence.

For example, an $n^{th}$ element of the first sequence may be denoted as r(n), where n=0, 1, 2, ..., N. The network device differentiates the first sequence to obtain one sequence. The sequence is referred to as a first differential sequence.

The first sequence is differentiated. For example, in one manner, the $n^{th}$ element of the first sequence is multiplied by a conjugate of an $(n-1)^{th}$ element, to obtain a new sequence, namely, the first differential sequence. For example, the first differential sequence may satisfy the following relationship.

$$d_1(n)=r(n) \times r((n+1) \bmod N)^* \qquad \text{(formula 5)}$$

where n=0, 1, 2, ..., N−1, or n=0, 1, 2, ..., N−1−l. $d_1(n)$ represents an $n^{th}$ element of the first differential sequence, or represents a conjugate of the $n^{th}$ element of the first differential sequence. r(n) represents an $n^{th}$ element of the first sequence. mod represents a modulo operation. r((n+1)mod N)* represents a conjugate of (r(n−1)mod N).

For example, in one understanding, in this embodiment of this application, when the first sequence is differentiated, an example in which a differentiation granularity is 1 is used.

S43: The network device may obtain a first cross correlation value corresponding to each candidate frequency domain root sequence in the U candidate frequency domain root sequences, based on the first differential sequence.

For content of the U candidate frequency domain root sequences, for example, the U candidate frequency domain root sequences, for example, are all ZC sequences, or all Alltop sequences, or some frequency domain root sequences in the U candidate frequency domain root sequences are ZC sequences, and remaining frequency domain root sequences in the U candidate frequency domain root sequences are Alltop sequences, refer to related description of S33 in the embodiment shown in FIG. 3.

For the $u^{th}$ candidate frequency domain root sequence in the U candidate frequency domain root sequences, a cross correlation value can be obtained. To avoid confusion with other cross correlation values that subsequently appear, the cross correlation value herein is referred to as a first cross correlation value. u=1, 2, ..., U. and U is a positive integer.

For example, the first cross correlation value corresponding to the $u^{th}$ candidate frequency domain root sequence is a cross correlation value between the first differential sequence and a second differential sequence corresponding to the un candidate frequency domain root sequence. The second differential sequence corresponding to the $u^{th}$ candidate frequency domain root sequence is a sequence obtained by differentiating the $u^{th}$ candidate frequency domain root sequence. For example, in one understanding, in this embodiment of this application, when the candidate frequency domain root sequence is differentiated, an example in which a differentiation granularity is 1 is also used. For example, the network device may differentiate the $u^{th}$ candidate frequency domain root sequence, to obtain the second differential sequence.

Since u=1, 2, ..., U, it indicates that the network device can differentiate all the U candidate frequency domain root sequences. For each candidate frequency domain root sequence in the U candidate frequency domain root sequences, a corresponding second differential sequence can be obtained. The U candidate frequency domain root sequences may include all candidate frequency domain root sequences of a first cell, or include some candidate frequency domain root sequences of the first cell. The first cell is a cell used by the network device to receive the first sequence.

For example, the second differential sequence corresponding to the $u^{th}$ candidate frequency domain root sequence may satisfy the following relationship:

$$c_{u,i}(n)=S_u(n) \times S_u((n+1) \bmod N)^* \qquad \text{(formula 6)}$$

where n=0, 1, 2 ..., N−1, or n=0, 1, 2 ..., N−1−l. $c_{u,i}(n)$ represents an $n^{th}$ element of the second differential sequence corresponding to the $u^{th}$ candidate frequency domain root sequence, or represents a conjugate of the $n^{th}$ element of the second differential sequence corresponding to the $u^{th}$ candidate frequency domain root sequence. $S_u(n)$ represents an $n^{th}$ element of the $u^{th}$ candidate frequency domain root sequence, where u∈{1, 2, ..., U}.

Then, the network device may obtain a first cross correlation value between the first differential sequence and a second differential sequence. To calculate a cross correlation value between two complex sequences, in one calculation manner, element-by-element conjugate multiplication is performed on the two complex sequences, all products are summed up, and then a modulo operation is performed on a result of the summation, to obtain the cross correlation value between the two complex sequences. For example, the network device calculates the first cross correlation value between a first differential sequence and a second differential sequence. Specifically, $d_i(n)$ may be multiplied by $s_u(n) \times s_u((n+1) \bmod N)^*$, all products are summed up, and then a modulo operation is performed on a result of the summation, to obtain the first cross correlation value between the first differential sequence and the second differential sequence.

For each frequency domain root sequence in the U candidate frequency domain root sequences, the network device can obtain one first cross correlation value, so that for the U candidate frequency domain root sequences, the network device can obtain a total of U first cross correlation values.

S44: The network device determines the K candidate frequency domain root sequences in the U candidate frequency domain root sequences based on the U first cross correlation values. K is an integer less than or equal to U.

In other words, the network device may select the K candidate frequency domain root sequences from the U candidate frequency domain root sequences based on the U first cross correlation values. A selection manner of the network device is provided herein.

For example, for the $u^{th}$ candidate frequency domain root sequence, the network device may obtain a cross correlation coefficient corresponding to the $u^{th}$ candidate frequency domain root sequence, based on the first cross correlation value corresponding to the $u^{th}$ candidate frequency domain root sequence. For the U candidate frequency domain root sequences, the network device may perform a similar operation, to obtain U cross correlation coefficients corresponding to the U candidate frequency domain root sequences.

After obtaining U cross correlation coefficients, the network device may select the K candidate frequency domain root sequences from the U candidate frequency domain root sequences based on the U cross correlation coefficients. For example, the network device may select K cross correlation coefficients with relatively large values from the U cross correlation coefficients, and the K cross correlation coefficients correspond to the K candidate frequency domain root sequences. In other words, the K cross correlation coefficients corresponding to the K candidate frequency domain root sequences are greater than the U–K cross correlation coefficients corresponding to U–K candidate frequency domain root sequences. The U–K candidate frequency domain root sequences are candidate frequency domain root sequences other than the K candidate frequency domain root sequences in the U candidate frequency domain root sequences. Alternatively, the network device may not compare the U cross correlation coefficients with each other, and instead, may compare the U cross correlation coefficients with the first threshold, and select the K candidate frequency domain root sequences whose cross correlation coefficients are greater than the first threshold. For example, the first threshold is configured by the network device, or is configured by a core network device, or may be specified by a protocol.

The network device may obtain the cross correlation coefficient corresponding to the $u^{th}$ candidate frequency domain root sequence, based on the first cross correlation value corresponding to the $u^{th}$ candidate frequency domain root sequence. For example, in one manner, the network device uses the first cross correlation value corresponding to the $u^{th}$ candidate frequency domain root sequence as the cross correlation coefficient corresponding to the $u^{th}$ candidate frequency domain root sequence, or in other words, the cross correlation coefficient corresponding to the $u^{th}$ candidate frequency domain root sequence is the first cross correlation value corresponding to the $u^{th}$ candidate frequency domain root sequence. Alternatively, in another manner, the network device may determine that the cross correlation coefficient corresponding to the $u^{th}$ candidate frequency domain root sequence is a×P, where P represents the first cross correlation value corresponding to the $u^{th}$ candidate frequency domain root sequence, a represents a coefficient, and a may be configured by the network device or specified by a protocol, or the like. Alternatively, the network device may determine the cross correlation coefficient corresponding to the $u^{th}$ candidate frequency domain root sequence in another manner.

In this embodiment of this application, the K candidate frequency domain root sequences selected by the network device correspond to relatively large cross correlation coefficients. The cross correlation coefficient is correlated with the received first sequence. A larger cross correlation coefficient indicates a higher possibility that the candidate frequency domain root sequence is correlated with the received first sequence. Therefore, the network device may filter candidate frequency domain root sequences with relatively high correlation with the received first sequence, and then determine, from these candidate frequency domain root sequences, a candidate frequency domain root sequence corresponding to the received first sequence, so that a success rate of detecting the first sequence can be ensured to the greatest extent and detection complexity can be reduced.

S45: The network device determines a candidate frequency domain root sequence and a time domain cyclic shift value that correspond to the first sequence, based on the first sequence and the K candidate frequency domain root sequences.

After determining the K candidate frequency domain root sequences, the network device may further determine one or more candidate frequency domain root sequences to which the first sequence actually corresponds in the K candidate frequency domain root sequences.

For more content of S45, refer to description of S35 in the embodiment shown in FIG. 3.

In this embodiment of this application, the K candidate frequency domain root sequences are first filtered based on a differentiation result of the received first sequence and differentiation results of candidate frequency domain root sequences, and a candidate frequency domain root sequence to which the first sequence actually corresponds only needs to be determined based on the first sequence and the K candidate frequency domain root sequences. For example, there are U candidate frequency domain root sequences. In this case, a current calculation amount is calculation of $U*C_s$ cross correlation values. In this embodiment of this application, a calculation amount is calculation of only $U+K*C_s$, where $C_s$ represents a quantity of sampled time domain cyclic shift values (for example, each candidate frequency domain root sequence in the K candidate frequency domain root sequences corresponds to a same quantity of time domain cyclic shift values, and the quantity is $C_s$). If K is less than U, the calculation amount required in this embodiment of this application is far less than the calculation amount required for current sequence detection. Therefore, the technical solution in this embodiment of this application can greatly reduce detection complexity of the receive end, and improve detection efficiency of the receive end.

Figure 5:
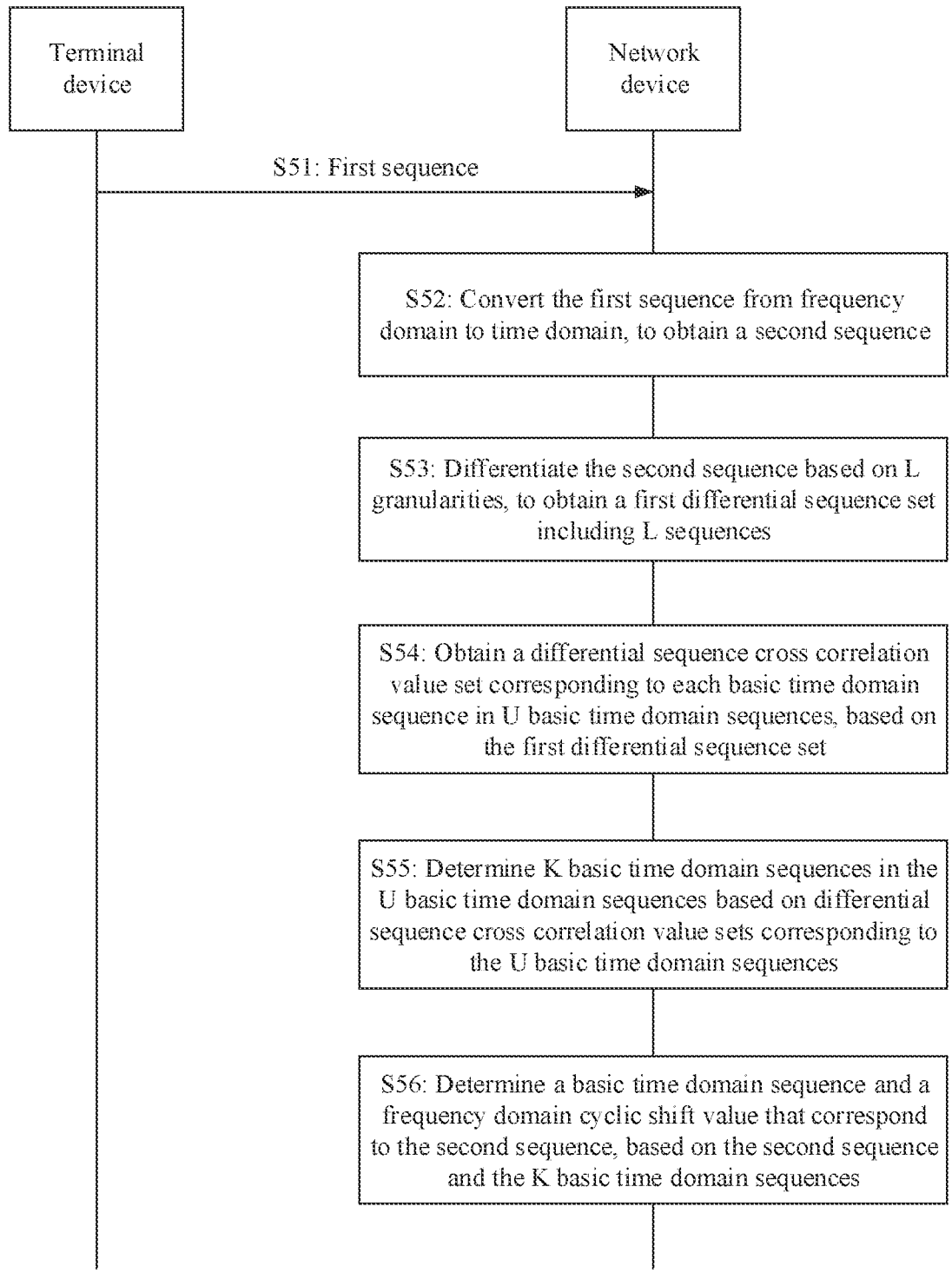
FIG. 5 is a flowchart of a third sequence detection method according to an embodiment of this application.

The embodiment shown in FIG. 3 and the embodiment shown in FIG. 4 both resolve the problem from frequency domain. An embodiment of this application provides a third sequence detection method in the following, and the third sequence detection method can resolve the problem from time domain. FIG. 5 is a flowchart of the method. In the following description, an example in which the method is applied to the network architecture shown in FIG. 2 is used.

For ease of description, an example in which the method is performed by the terminal device and the network device is used below. Because this embodiment uses an example in which this embodiment is applied to the network architecture shown in FIG. 2, the terminal device in the following description may implement the function of the terminal device in the network architecture shown in FIG. 2. The network device in the following description may implement the function of the network device in the network architecture shown in FIG. 2.

S51: The network device receives a first sequence carried on a plurality of subcarriers.

The terminal device may send the sequence on the plurality of subcarriers based on a requirement. Therefore, the first sequence may include a sequence sent by one or more terminal devices (FIG. 5 merely uses one terminal device as an example, but actually, the first sequence may be sent by one terminal device to the network device, or may include sequences sent by a plurality of terminal devices to the network device), or may not include a sequence sent by any terminal device, to be specific, may include only noise.

In this embodiment of this application, the sequence sent by the terminal device, for example, is a RACH sequence. The RACH sequence, for example, is a ZC sequence or an Alltop sequence. Alternatively, the sequence sent by the terminal device may be another sequence.

S52: The network device converts the first sequence from frequency domain to time domain, to obtain a second sequence.

For example, an $n^{th}$ element of the first sequence may be denoted as r(n), where n=0, 1, 2, . . . , N. The network device may convert the first sequence to time domain. For example, the network device may perform IFFT on the first sequence, to convert the first sequence to time domain, and obtain the second sequence.

S53: The network device differentiates the second sequence based on L granularities, to obtain a first differential sequence set including L sequences, where L is a positive integer.

For example, an $n^{th}$ element of the second sequence may be denoted as t(n), where n=0, 1, 2, . . . , N. The network device differentiates the second sequence based on the L granularities, so that the L sequences can be obtained. For example, the L sequences may also be referred to as L first differential sequences. For example, the L first differential sequences belong to the first differential sequence set. The first differential sequence set may actually exist. To be specific, the network device places the L first differential sequences into one set, and the set is the first differential sequence set. Alternatively, the first differential sequence set may not exist. The network device merely obtains the L first differential sequences, and does not place the L first differential sequences into one set.

The second sequence is differentiated based on the differentiation granularity l. For example, in one manner, the $n^{th}$ element of the second sequence is multiplied by a conjugate of an $(n-l)^{th}$ element, to obtain a new sequence, namely, a first differential sequence in the L first differential sequences. For example, an $l^{th}$ first differential sequence in the first differential sequence set may satisfy the following relationship:

$$f_l(n)=t(n)\times t((n+l) \bmod N)^* \qquad \text{(formula 7)}$$

where n=0, 1, 2, . . . , N−1, or n=0, 1, 2, . . . , N−1−l. $f_l(n)$ represents an $n^{th}$ element of the $n^{th}$ first differential sequence in the first differential sequence set, or represents a conjugate of the $n^{th}$ element of the $l^{th}$ sequence in the first differential sequence set. t(n) represents an $n^{th}$ element of the second sequence. l represents a differentiation granularity, where l∈{1, 2, . . . , L}. mod represents a modulo operation. t((n+l)mod N)* represents a conjugate of (t(n+l)mod N).

For example, L=2, and l may be separately 1 and 2. In this case, the network device differentiates the second sequence based on the differentiation granularity 1, to obtain one first differential sequence. The first differential sequence may satisfy $f_l(n)=t(n)\times t((n+1) \bmod N)^*$. In addition, the network device differentiates the second sequence based on the differentiation granularity 2, to obtain another first differential sequence. The first differential sequence may satisfy $f_l(n)=t(n)\times t((n+2) \bmod N)^*$.

S54: The network device may obtain a differential sequence cross correlation value set corresponding to each basic time domain sequence in the U basic time domain sequences, based on the first differential sequence set.

For example, the U basic time domain sequences may all be Alltop sequences. For example, the $u^{th}$ basic time domain sequence in the U basic time domain sequences may satisfy the following relationship:

$$x_u(n) = \alpha e^{j2\pi\left(\frac{u_1((n+m) \bmod P)^3}{P} + \varphi\right)} \qquad \text{(formula 8)}$$

where n=0, 1, 2, . . . , N−1, N represents a length of the $u^{th}$ basic time domain sequence, $x_u(n)$ represents an $n^{th}$ element of the $u^{th}$ basic time domain sequence, a is a non-zero complex number, φ is a real number, j represents an imaginary number symbol in a complex number, mod represents a modulo operation, $u_1$ represents an index of the basic time domain sequence, a value range of $u_1$ is positive integers less than or equal to P−1, m represents a time domain cyclic shift value of the basic time domain sequence, a value range of m is natural numbers less than or equal to P−1, and P is a prime number.

For example, each basic time domain sequence in the U basic time domain sequences may satisfy the relationship shown in formula 8, or some of the U basic time domain sequences may satisfy the relationship shown in formula 8, and remaining basic time domain sequences in the U basic time domain sequences may not satisfy the relationship shown in formula 8, for example, may satisfy another relationship.

For the $u^{th}$ basic time domain sequence in the U basic time domain sequences, a differential sequence cross correlation value set including L cross correlation values may be obtained. To avoid confusion with other cross correlation values that subsequently appear, the cross correlation values included in the differential sequence cross correlation value set are referred to as first cross correlation values herein. For example, for the $u^{th}$ basic time domain sequence in the U basic time domain sequences, a differential sequence cross correlation value set including L first cross correlation values may be obtained. u=1, 2, . . . , U, and U is a positive integer.

In this embodiment of this application, each basic time domain sequence in the U basic time domain sequences may actually include all or some time domain cyclic shift sequences corresponding to one or more basic sequences, and therefore is referred to as the "basic time domain sequence". For example, a first cell has a total of one or more candidate basic sequences. Each basic sequence in the one or more basic sequences may correspond to one or more time domain cyclic shift values. Each time domain cyclic shift value may correspond to one time domain cyclic shift sequence. Therefore, each basic sequence in the one or more basic sequences may correspond to one or more time domain cyclic shift sequences. The U basic time domain sequences in S54 are time domain cyclic shift sequences corresponding to the basic sequences. The U basic time domain sequences may be all time domain cyclic shift sequences corresponding to all basic sequences that correspond to the first cell; or the U basic time domain sequences may be all time domain cyclic shift sequences corresponding to some basic sequences that correspond to the first cell; or the U basic time domain sequences may be some time domain cyclic shift sequences corresponding to all basic sequences that correspond to the first cell. The first cell is a cell used by the network device to receive the first sequence in S51.

For example, an $l^{th}$ first cross correlation value in the differential sequence cross correlation value set corresponding to the $u^{th}$ basic time domain sequence is a cross correlation value between an $l^{th}$ first differential sequence in the first differential sequence set and an $l^{th}$ sequence in a second differential sequence set corresponding to the u basic time domain sequence, where l=1, 2, . . . , L. The second differential sequence set corresponding to the $u^{th}$ basic time domain sequence is a sequence set obtained by differentiating the $u^{th}$ basic time domain sequence based on the L granularities, a differentiation granularity corresponding to the $l^{th}$ first differential sequence in the first differential sequence set is the same as that corresponding to the $l^{th}$ sequence in the second differential sequence set corresponding to the $u^{th}$ basic time domain sequence, u=1, 2, . . . , U, and U is a positive integer.

For example, the network device may differentiate the $u^{th}$ basic time domain sequence based on the L differentiation granularities, to obtain the second differential sequence set. The second differential sequence set includes L sequences. For example, the L sequences may also be referred to as L second differential sequences. For example, the L second differential sequences belong to the second differential sequence set. The second differential sequence set may actually exist. To be specific, the network device places the L second differential sequences into one set, and the set is the second differential sequence set. Alternatively, the second differential sequence set may not exist. The network device merely obtains the L second differential sequences, and does not place the L second differential sequences into one set.

Since u=1, 2, . . . , U, and U is an integer, it indicates that the network device may differentiate all the U basic time domain sequences based on the L differentiation granularities. For each basic time domain sequence in the U basic time domain sequences, a corresponding second differential sequence set can be obtained.

For example, the $l_{th}$ second differential sequence in the second differential sequence set corresponding to the $u^{th}$ basic time domain sequence may satisfy, the following relationship:

$$g_{u,l}(n)=x_u(n)\times x_u((n+l) \bmod N)^* \quad \text{(formula 9)}$$

where n=0, 1, 2, . . . , N. $g_{u,l}(n)$ represents an $n^{th}$ element of the $l^{th}$ second differential sequence in the second differential sequence set corresponding to the $u^{th}$ basic time domain sequence, or represents a conjugate of the nib element of the $l^{th}$ second differential sequence in the second differential sequence set corresponding to the $u^{th}$ basic time domain sequence. $x_u(n)$ represents an $n^{th}$ element of the $u^{th}$ basic time domain sequence, where u∈{1, 2, . . . , U}. l represents a differentiation granularity, where l∈{1, 2, . . . , L}. mod represents a modulo operation. For example, L=1. In this case, l=1, and formula 9 is $g_{u,l}(n)=x_u(n)\times x_u((n+1) \bmod N)^*$.

For example, L=2, and l may be separately 1 and 2. In this case, the network device differentiates the $u^{th}$ basic time domain sequence based on the differentiation granularity 1, to obtain one second differential sequence. The second differential sequence may satisfy $g_{u,l}(n)=x_u(n)\times x_u((n+1) \bmod N)^*$. In addition, the network device differentiates the $u^{th}$ basic time domain sequence based on the differentiation granularity 2, to obtain one second differential sequence. The second differential sequence may satisfy $g_{u,l}(n)=x_u(n)\times x_u((n+2) \bmod N)^*$.

When differentiating the second sequence and the $u^{th}$ basic time domain sequence, the network device uses the same L differentiation granularities. Therefore, from the perspective of the differentiation granularity, the differentiation result of the second sequence (namely, the obtained L first differential sequences) and the differentiation result of the $u^{th}$ basic time domain sequence (namely, the obtained L second differential sequences) may be in one-to-one correspondence with each other, or in other words, the L first differential sequences in the first differential sequence set and the L second differential sequences in the second differential sequence set may be in one-to-one correspondence with each other. Correspondence herein means that differentiation granularities are the same. For example, in the L first differential sequences, there is one first differential sequence with a differentiation granularity of 1, and in the L second differential sequences, there is also one second differential sequence with a differentiation granularity of 1. In this case, the first differential sequence corresponds to the second differential sequence. In another example, in the L first differential sequences, there is one first differential sequence with a differentiation granularity of 2, and in the L second differential sequences, there is also one second differential sequence with a differentiation granularity of 2. In this case, the first differential sequence corresponds to the second differential sequence.

If L=1, a calculation manner is relatively simple. The first differential sequence set only needs to include one first sequence, and the second differential sequence set only needs to include one second sequence, so that a calculation amount can be reduced. However, if the network device simultaneously receives sequences from two terminal devices, the first sequence is obtained by superimposing the two sequences and noise, and the two sequences are obtained by using different frequency domain cyclic shift values for a same basic time domain sequence, a difference between the frequency domain cyclic shift values of the two sequences may be a half of a maximum frequency domain cyclic shift value. If L=1, the first sequence is differentiated. A result obtained by performing differentiation may be that the two sequences cancel each other out. Consequently, the network device cannot determine, by using a differential sequence cross correlation value, whether the two sequences are sent. In other words, the network device cannot detect any one of the two sequences. Therefore, in this embodiment of this application, L may be alternatively greater than 1. Because a plurality of differentiation granularities are used when the first sequence is differentiated, even though differentiation results of different sequences cancel each other out in the case of one differentiation granularity, normal sequences after differentiation are still obtained in the case of other differentiation results. In this case, even though the first sequence simultaneously received by the network device includes sequences from two or more terminal devices, a detection result can be normally obtained, so that the network device detects the first sequence more accurately.

In this way, the network device may obtain a first cross correlation value between a first differential sequence and a second differential sequence that correspond to each other in the first differential sequence set and the second differential sequence set. To calculate a cross correlation value between two complex sequences, in one calculation manner, element-by-element conjugate multiplication is performed on the two complex sequences, all products are summed up, and then a modulo operation is performed on a result of the summation, to obtain the cross correlation value between the two complex sequences. For example, the network device calculates the first cross correlation value between a first differential sequence and a second differential sequence that correspond to each other. Specifically, $f_l(n)$ may be multiplied by $x_u(n)\times x_u((n+l) \bmod N)^*$, all products are summed up, and then a modulo operation is performed on a result of the summation, to obtain the first cross correlation value between the first differential sequence and the second differential sequence.

Because the first differential sequence set includes L first differential sequences, the second differential sequence set corresponding to the $u^{th}$ basic time domain sequence includes L second differential sequences, and the L first differential sequences are in one-to-one correspondence with the L second differential sequences, this is equivalent to that the network device can obtain L first cross correlation values for the second sequence and the $u^{th}$ basic time domain sequence. For example, the L first cross correlation values belong to a differential sequence cross correlation value set. The differential sequence cross correlation value set may actually exist. To be specific, the network device places the L first cross correlation values into one set, and the set is the differential sequence cross correlation value set. Alternatively, the differential sequence cross correlation value set may not exist. The network device merely obtains the L first cross correlation values for the $u^{th}$ basic time domain sequence, and does not place the L first cross correlation values into one set.

For the U basic time domain sequences, the network device can obtain a total of U×L first cross correlation values. For example, the U×L first cross correlation values may belong to U differential sequence cross correlation value sets.

S55: The network device determines K basic time domain sequences based on differential sequence cross correlation value sets corresponding to the U basic time domain sequences. K is an integer less than U. Optionally, K may be greater than 0.

In other words, the network device may select the K basic time domain sequences from the U basic time domain sequences based on the U×L first cross correlation values. A selection manner of the network device is provided herein.

For example, for the $u^{th}$ basic time domain sequence, the network device may obtain a cross correlation coefficient corresponding to the $u^{th}$ basic time domain sequence, based on the differential sequence cross correlation value set corresponding to the $u^{th}$ basic time domain sequence, or in other words, based on the L first cross correlation values corresponding to the $u^{th}$ basic time domain sequence. For the U basic time domain sequences, the network device may perform a similar operation, to obtain U cross correlation coefficients corresponding to the U basic time domain sequences.

After obtaining the U cross correlation coefficients, the network device may select the K basic time domain sequences from the U basic time domain sequences based on the U cross correlation coefficients. For example, the network device may select K cross correlation coefficients with relatively large values from the U cross correlation coefficients, and the K cross correlation coefficients correspond to the K basic time domain sequences. In other words, the K cross correlation coefficients corresponding to the K basic time domain sequences are greater than the U−K cross correlation coefficients corresponding to U−K basic time domain sequences. The U−K candidate frequency domain root sequences are basic time domain sequences other than the K basic time domain sequences in the U candidate frequency domain root sequences. Alternatively, the network device may not compare the U cross correlation coefficients with each other, and instead, may compare the U cross correlation coefficients with the first threshold, and select the K basic time domain sequences whose cross correlation coefficients are greater than the first threshold. For example, the first threshold is configured by the network device, or is configured by a core network device, or may be specified by a protocol.

The network device may obtain the cross correlation coefficient corresponding to the $u^{th}$ basic time domain sequence, based on the differential sequence cross correlation value set corresponding to the $u^{th}$ basic time domain sequence, or in other words, based on the L first cross correlation values corresponding to the $u^{th}$ basic time domain sequence. For example, in one manner, the network device adds up the L first cross correlation values corresponding to the $u^{th}$ basic time domain sequence, and the obtained result is used as the cross correlation coefficient corresponding to the $u^{th}$ basic time domain sequence, or in other words, the cross correlation coefficient corresponding to the $u^{th}$ basic time domain sequence is the sum of the L first cross correlation values corresponding to the $u^{th}$ basic time domain sequence. Alternatively, in another manner, the network device may determine the largest value of the L first cross correlation values corresponding to the $u^{th}$ basic time domain sequence, and the largest value may be used as the cross correlation coefficient corresponding to the $u^{th}$ basic time domain sequence, or in other words, the cross correlation coefficient corresponding to the $u^{th}$ basic time domain sequence is the largest value of the L first cross correlation values corresponding to the $u^{th}$ basic time domain sequence. Alternatively, in still another manner, the network device may obtain the average value of the L first cross correlation values corresponding to the $u^{th}$ basic time domain sequence, and the obtained average value is used as the cross correlation coefficient corresponding to the $u^{th}$ basic time domain sequence, or in other words, the cross correlation coefficient corresponding to the $u^{th}$ basic time domain sequence is the average value of the L first cross correlation values corresponding to the $u^{th}$ basic time domain sequence. The average value herein may be an arithmetic average value, or a weighted average value. If the average value is a weighted average value, a weight corresponding to the L first cross correlation values may be configured by the network device, specified by a protocol, or the like. Certainly, only several possibilities are listed herein. A manner of obtaining the cross correlation coefficient corresponding to the basic time domain sequence by the network device is not limited in this embodiment of this application.

In this embodiment of this application, the K basic time domain sequences selected by the network device correspond to relatively large cross correlation coefficients. The cross correlation coefficient is correlated with the received first sequence. A larger cross correlation coefficient indicates a higher possibility that the basic time domain sequence is correlated with the received first sequence. Therefore, the network device may filter basic time domain sequences with relatively high correlation with the received first sequence, and then determine, from these basic time domain sequences, a basic time domain sequence corresponding to the received first sequence, so that a success rate of detecting the first sequence can be ensured to the greatest extent and detection complexity can be reduced.

S56: The network device determines a basic time domain sequence and a frequency domain cyclic shift value that correspond to the second sequence, based on the second sequence and the K basic time domain sequences.

After determining the K basic time domain sequences, the network device may further determine one or more basic time domain sequences to which the second sequence actually corresponds in the K basic time domain sequences.

For example, the network device may determine one or more frequency domain cyclic shift values corresponding to each basic time domain sequence in the K basic time domain sequences, and can obtain a corresponding frequency domain cyclic shift sequence based on each frequency domain cyclic shift value corresponding to each basic time domain sequence. In this way, each basic time domain sequence in the K basic time domain sequences may correspond to one or more frequency domain cyclic shift sequences. The network device may obtain the cross correlation value between the second sequence and each frequency domain cyclic shift sequence that corresponds to each basic time domain sequence in the K basic time domain sequences. For example, the cross correlation value herein is referred to as the second cross correlation value. After obtaining the second cross correlation value between the second sequence and each frequency domain cyclic shift sequence that corresponds to each basic time domain sequence in the K basic time domain sequences, the network device may determine whether the second cross correlation value is greater than a threshold, and a time domain cyclic shift sequence corresponding to the cross correlation value greater than the threshold is a sequence corresponding to the first sequence. Optionally, before determining whether the second cross correlation value is greater than the threshold, the network device may perform noise normalization on the second cross correlation value, and then determine whether the second cross correlation value is greater than the threshold. A frequency domain cyclic shift sequence corresponding to a second cross correlation value greater than the threshold corresponds to one basic time domain sequence and corresponds to one frequency domain cyclic shift value. This is equivalent to determining, by the network device, the basic time domain sequence and the frequency domain cyclic shift value that correspond to the second sequence. The basic time domain sequence and the frequency domain cyclic shift value that correspond to the second sequence are the basic time domain sequence and the frequency domain cyclic shift value that correspond to the first sequence.

After determining the basic time domain sequence and the frequency domain cyclic shift value that correspond to the second sequence, for example, the network device may determine, based on the basic time domain sequence and/or the frequency domain cyclic shift value, whether a terminal device transmits a RACH signal and determine a sequence based on which the transmitted RACH signal is generated, and may further determine a delay of the terminal device, to determine an uplink TA for the terminal device based on the delay. The network device may notify the terminal device of the determined uplink TA, so that the terminal device can adjust a transmit time of an uplink signal based on the uplink TA. For example, for a terminal device with a larger propagation delay, the uplink TA may be larger, to be specific, the transmit time of the uplink signal is earlier. In this way, it can be ensured to the greatest extent that signals of all terminal devices reach the network device at a basically same time. Alternatively, the network device may further apply the basic time domain sequence and/or the frequency domain cyclic shift value for other purposes.

In this embodiment of this application, the K basic time domain sequences are first filtered based on a differentiation result of the second sequence corresponding to the received first sequence and differentiation results of candidate basic time domain sequences, and a basic time domain sequence to which the second sequence actually corresponds only needs to be determined based on the second sequence and the K basic time domain sequences. For example, there are U candidate basic time domain sequences. In this case, a current calculation amount is calculation of $U*C_s$ cross correlation values. In this embodiment of this application, a calculation amount is calculation of only $L*C_s+K*U$ cross correlation values, where $C_s$ represents a quantity of sampled frequency domain cyclic shift values (for example, each basic sequence in basic sequences corresponding to the U basic time domain sequences corresponds to a same quantity of frequency domain cyclic shift values, and the quantity is $C_s$), and L represents a quantity of differentiation granularities. If K is less than U, the calculation amount required in this embodiment of this application is far less than the calculation amount required for current sequence detection. Therefore, the technical solution in this embodiment of this application can greatly reduce detection complexity of the receive end, and improve detection efficiency of the receive end.

Figure 6:
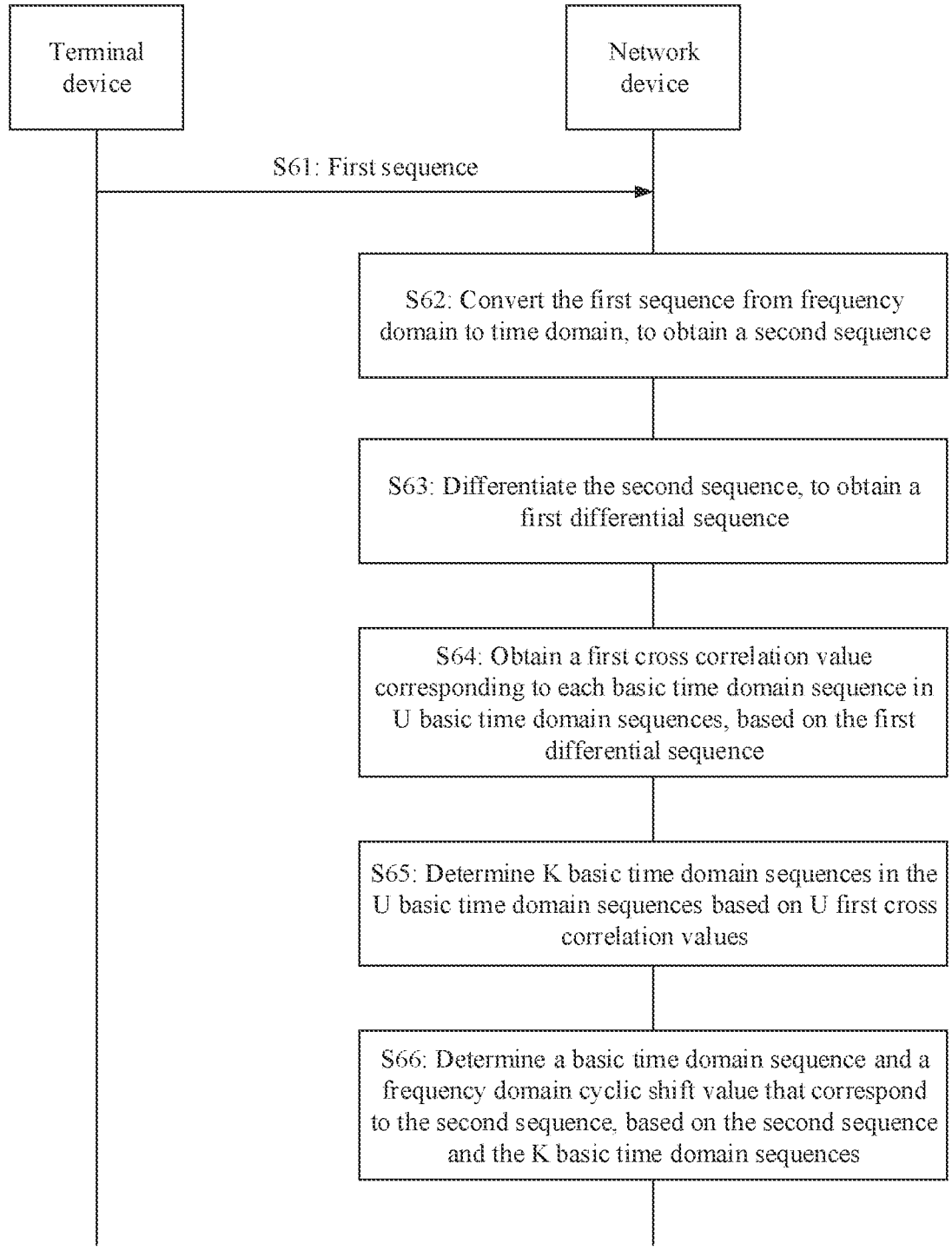
FIG. 6 is a flowchart of a fourth sequence detection method according to an embodiment of this application.

For the method provided in the embodiment shown in FIG. 5, there is a special case, namely, a case in which L=1. In the following, an embodiment of this application provides a fourth sequence detection method for describing this case. FIG. 6 is a flowchart of the method. In the following description, an example in which the method is applied to the network architecture shown in FIG. 2 is used.

For ease of description, an example in which the method is performed by the terminal device and the network device is used below. Because this embodiment uses an example in which this embodiment is applied to the network architecture shown in FIG. 2, the terminal device in the following description may implement the function of the terminal device in the network architecture shown in FIG. 2. The network device in the following description may implement the function of the network device in the network architecture shown in FIG. 2.

S61: The network device receives a first sequence carried on a plurality of subcarriers.

The terminal device may send the sequence on the plurality of subcarriers based on a requirement. Therefore, the first sequence may include a sequence sent by one or more terminal devices (FIG. 6 merely uses one terminal device as an example, but actually, the first sequence may be sent by one terminal device to the network device, or may include sequences sent by a plurality of terminal devices to the network device), or may not include a sequence sent by any terminal device, to be specific, may include only noise.

In this embodiment of this application, the sequence sent by the terminal device, for example, is a RACH sequence. The RACH sequence, for example, is a ZC sequence or an Alltop sequence. Alternatively, the sequence sent by the terminal device may be another sequence.

S62: The network device converts the first sequence from frequency domain to time domain, to obtain a second sequence.

For example, an $n^{th}$ element of the first sequence may be denoted as r(n), where n=0, 1, 2, . . . , N−1, or n=0, 1, 2, . . . , N−1−l. The network device may convert the first sequence to time domain. For example, the network device may perform IFFT on the first sequence, to convert the first sequence to time domain, and obtain the second sequence.

S63: The network device differentiates the second sequence, to obtain a first differential sequence.

For example, an $n^{th}$ element of the second sequence may be denoted as t(n), where n=0, 1, 2, . . . , N−1, or n=0, 1, 2, . . . , N−1−l. The network device differentiates the second sequence to obtain one sequence. The sequence is referred to as a first differential sequence.

The second sequence is differentiated. For example, in one manner, the $n^{th}$ element of the second sequence is multiplied by a conjugate of an $(n-1)^{th}$ element, to obtain a new sequence, namely, the first differential sequence. For example, the first differential sequence may satisfy the following relationship:

$$f_l(n)=t(n)\times t((n+1) \bmod N)^* \quad \text{(formula 10)}$$

where n=0, 1, 2, ..., N, or n=0, 1, 2, ..., N−1−1. $f_l(n)$ represents an $n^{th}$ element of the first differential sequence, or represents a conjugate of the $n^{th}$ element of the first differential sequence. t(n) represents an $n^{th}$ element of the second sequence. mod represents a modulo operation. $t((n+1) \bmod N)^*$ represents a conjugate of $(t(n+1) \bmod N)$.

For example, in one understanding, in this embodiment of this application, when the second sequence is differentiated, an example in which a differentiation granularity is 1 is used.

S64: The network device may obtain a first cross correlation value corresponding to each basic time domain sequence in the U basic time domain sequences, based on the first differential sequence.

For content of the U basic time domain sequences, for example, the U basic time domain sequences may all be Alltop sequences, refer to related description of S54 in the embodiment shown in FIG. 5.

For the $u^{th}$ basic time domain sequence in the U basic time domain sequences, a cross correlation value may be obtained. To avoid confusion with other cross correlation values that subsequently appear, the cross correlation value herein is referred to as the first cross correlation value. u=1, 2, ..., U. and U is a positive integer.

In this embodiment of this application, each basic time domain sequence in the U basic time domain sequences may actually include all or some time domain cyclic shift sequences corresponding to one or more basic sequences, and therefore is referred to as the "basic time domain sequence". For example, a first cell has a total of one or more candidate basic sequences. Each basic sequence in the one or more basic sequences may correspond to one or more time domain cyclic shift values. Each time domain cyclic shift value may correspond to one time domain cyclic shift sequence. Therefore, each basic sequence in the one or more basic sequences may correspond to one or more time domain cyclic shift sequences. The U basic time domain sequences in S64 are time domain cyclic shift sequences corresponding to the basic sequences. The U basic time domain sequences may be all time domain cyclic shift sequences corresponding to all basic sequences that correspond to the first cell; or the U basic time domain sequences may be all time domain cyclic shift sequences corresponding to some basic sequences that correspond to the first cell; or the U basic time domain sequences may be some time domain cyclic shift sequences corresponding to all basic sequences that correspond to the first cell. The first cell is a cell used by the network device to receive the first sequence in S61.

For example, the first cross correlation value corresponding to the $u^{th}$ basic time domain sequence is a cross correlation value between the first differential sequence and a second differential sequence corresponding to the $u^{th}$ basic time domain sequence. The second differential sequence corresponding to the $u^{th}$ basic time domain sequence is a sequence obtained by differentiating the $u^{th}$ basic time domain sequence. For example, in one understanding, in this embodiment of this application, when the basic time domain sequence is differentiated, an example in which a differentiation granularity is 1 is also used. For example, the network device may differentiate the $u^{th}$ basic time domain sequence, to obtain the second differential sequence.

Since u=1, 2, ..., U, it indicates that the network device can differentiate all the U basic time domain sequences. For each basic time domain sequence in the U basic time domain sequences, a corresponding second differential sequence can be obtained.

For example, the second differential sequence corresponding to the $u^{th}$ basic time domain sequence may satisfy the following relationship:

$$g_{u,l}(n)=x_u(n)\times x_u((n+1) \bmod N)^* \quad \text{(formula 11)}$$

where n=0, 1, 2 ..., N, or n=0, 1, 2, ..., N−1−1. $g_{u,l}(n)$ represents an $n^{th}$ element of the second differential sequence corresponding to the $u^{th}$ basic time domain sequence, or represents a conjugate of the $n^{th}$ element of the second differential sequence corresponding to the $u^{th}$ basic time domain sequence. $x_u(n)$ represents an $n^{th}$ element of the $u^{th}$ basic time domain sequence, where $u \in \{1, 2, ..., U\}$. mod represents a modulo operation.

Then, the network device may obtain a first cross correlation value between the first differential sequence and a second differential sequence. To calculate a cross correlation value between two complex sequences, in one calculation manner, element-by-element conjugate multiplication is performed on the two complex sequences, all products are summed up, and then a modulo operation is performed on a result of the summation, to obtain the cross correlation value between the two complex sequences. For example, the network device calculates the first cross correlation value between a first differential sequence and a second differential sequence that correspond to each other. Specifically, $f_l(n)$ may be multiplied by $x_u(n)\times x_u((n+1) \bmod N)^*$, all products are summed up, and then a modulo operation is performed on a result of the summation, to obtain the first cross correlation value between the first differential sequence and the second differential sequence.

For each basic time domain sequence in the U basic time domain sequences, the network device can obtain one first cross correlation value, so that for the U basic time domain sequences, the network device can obtain a total of U first cross correlation values.

S65: The network device determines K basic time domain sequences in the U basic time domain sequences based on the U first cross correlation values. K is an integer less than U. Optionally, K may be greater than or equal to 0.

In other words, the network device may select the K basic time domain sequences from the U basic time domain sequences based on the U first cross correlation values. A selection manner of the network device is provided herein.

For example, for the $u^{th}$ basic time domain sequence, the network device may obtain a cross correlation coefficient corresponding to the $u^{th}$ basic time domain sequence, based on the first cross correlation value corresponding to the $u^{th}$ basic time domain sequence. For the U basic time domain sequences, the network device may perform a similar operation, to obtain U cross correlation coefficients corresponding to the U basic time domain sequences.

After obtaining the U cross correlation coefficients, the network device may select the K basic time domain sequences from the U basic time domain sequences based on the U cross correlation coefficients. For example, the network device may select K cross correlation coefficients with relatively large values from the U cross correlation coefficients, and the K cross correlation coefficients correspond to the K basic time domain sequences. In other words, the K cross correlation coefficients corresponding to the K basic time domain sequences are greater than the U−K cross correlation coefficients corresponding to U−K basic time domain sequences. The U−K basic time domain sequences are basic time domain sequences other than the K basic time domain sequences in the U basic time domain sequences. Alternatively, the network device may not compare the U cross correlation coefficients with each other, and instead, may compare the U cross correlation coefficients with the first threshold, and select the K basic time domain sequences whose cross correlation coefficients are greater than the first threshold. For example, the first threshold is configured by the network device, or is configured by a core network device, or may be specified by a protocol.

The network device may obtain the cross correlation coefficient corresponding to the $u^{th}$ basic time domain sequence, based on the first cross correlation value corresponding to the $u^{th}$ basic time domain sequence. For example, in one manner, the network device uses the first cross correlation value corresponding to the $u^{th}$ basic time domain sequence as the cross correlation coefficient corresponding to the $u^{th}$ basic time domain sequence, or in other words, the cross correlation coefficient corresponding to the $u^{th}$ basic time domain sequence is the first cross correlation value corresponding to the $u^{th}$ basic time domain sequence. Alternatively, in another manner, the network device may determine that the cross correlation coefficient corresponding to the $u^{th}$ basic time domain sequence is a×P, where P represents the first cross correlation value corresponding to the $u^{th}$ basic time domain sequence, a represents a coefficient, and a may be configured by the network device or specified by a protocol, or the like. Alternatively, the network device may determine the cross correlation coefficient corresponding to the $u^{th}$ basic time domain sequence in another manner.

In this embodiment of this application, the K basic time domain sequences selected by the network device correspond to relatively large cross correlation coefficients. The cross correlation coefficient is correlated with the received first sequence. A larger cross correlation coefficient indicates a higher possibility that the basic time domain sequence is correlated with the received first sequence. Therefore, the network device may filter basic time domain sequences with relatively high correlation with the received first sequence, and then determine, from these basic time domain sequences, a basic time domain sequence corresponding to the received first sequence (or in other words, determine a basic time domain sequence corresponding to the second sequence), so that a success rate of detecting the first sequence can be ensured to the greatest extent and detection complexity can be reduced.

S66: The network device determines a basic time domain sequence and a frequency domain cyclic shift value that correspond to the second sequence, based on the second sequence and the K basic time domain sequences.

After determining the K basic time domain sequences, the network device may further determine one or more basic time domain sequences to which the second sequence actually corresponds in the K basic time domain sequences.

For more content of S66, refer to description of S56 in the embodiment shown in FIG. 5.

In this embodiment of this application, the K basic time domain sequences are first filtered based on a differentiation result of the second sequence corresponding to the received first sequence and differentiation results of candidate basic time domain sequences, and a basic time domain sequence to which the second sequence actually corresponds only needs to be determined based on the second sequence and the K basic time domain sequences. For example, there are U candidate basic time domain sequences. In this case, a current calculation amount is calculation of $U*C_s$ cross correlation values. In this embodiment of this application, a calculation amount is calculation of only $C_s+K*U$, where $C_s$ represents a quantity of sampled time domain cyclic shift values (for example, each basic sequence in basic sequences corresponding to the U basic time domain sequences corresponds to a same quantity of time domain cyclic shift values, and the quantity is $C_s$). If K is less than U, the calculation amount required in this embodiment of this application is far less than the calculation amount required for current sequence detection. Therefore, the technical solution in this embodiment of this application can greatly reduce detection complexity of the receive end, and improve detection efficiency of the receive end.

In a description process of any one of embodiments shown in FIG. 3 to FIG. 6, an uplink process is used as an example. In other words, the terminal device sends the first sequence, and the network device detects the first sequence. However, in another scenario, the solution provided in embodiments of this application may also be applied to a downlink process. The network device sends the first sequence, and the terminal device detects the first sequence. A detection manner of the terminal device may also be similar to the detection manner of the network device described above. Alternatively, the solution provided in embodiments of this application may also be applied to a sidelink process. A terminal device 1 sends the first sequence, and a terminal device 2 detects the first sequence. A detection manner of the terminal device 2 may also be similar to the detection manner of the network device described above.

The following describes, with reference to the accompanying drawings, apparatuses configured to implement the foregoing methods in embodiments of this application. Therefore, all the foregoing content may be used in the following embodiments. Repeated content is not described again.

Figure 7:
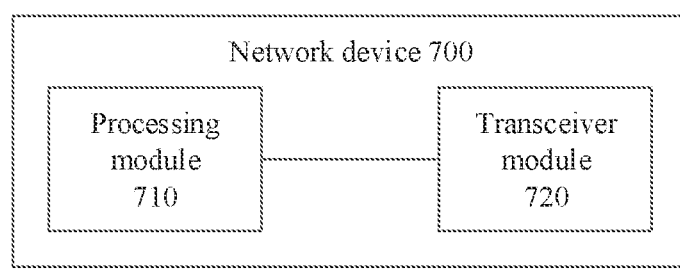
FIG. 7 is a schematic block diagram of a first network device according to an embodiment of this application.

FIG. 7 is a schematic block diagram of a communications apparatus 700 according to an embodiment of this application. For example, the communications apparatus 700 is a network device 700.

The network device 700 includes a processing module 710 and a transceiver module 720. For example, the network device 700 may be a network device, or may be a chip used in the network device or another combined device, component, or the like that has a function of the foregoing network device. When the network device 700 is a network device, the transceiver module 720 may be a transceiver. The transceiver may include an antenna, a radio frequency circuit, and the like. The processing module 710 may be a processor. The processor may include one or more central processing units (central processing units, CPUs). When the network device 700 is a component that has a function of the foregoing network device, the transceiver module 720 may be a radio frequency unit, and the processing module 710 may be a processor. When the network device 700 is a chip system, the transceiver module 720 may be an input/output interface of the chip, and the processing module 710 may be a processor of the chip system, and may include one or more central processing units.

For example, the processing module 710 may be configured to perform all operations except receiving and sending operations performed by the network device in the embodiment shown in FIG. 3, for example, S32 to S35, and/or configured to support another process of the technology described in this specification. The transceiver module 720 may be configured to perform all sending operations performed by the network device in the embodiment shown in FIG. 3, for example, S31, and/or configured to support another process of the technology described in this specification.

For another example, the processing module 710 may be configured to perform all operations except receiving and sending operations performed by the network device in the embodiment shown in FIG. 4, for example, S42 to S45, and/or configured to support another process of the technology described in this specification. The transceiver module 720 may be configured to perform all sending operations performed by the network device in the embodiment shown in FIG. 4, for example, S41, and/or configured to support another process of the technology described in this specification.

In addition, the transceiver module 720 may be a functional module, and the functional module can complete both a sending operation and a receiving operation. For example, the transceiver module 720 may be configured to perform all sending operations and receiving operations performed by the network device in the embodiment shown in FIG. 3 or the embodiment shown in FIG. 4. For example, when performing the sending operation, the transceiver module 720 may be considered as a sending module, and when performing the receiving operation, the transceiver module 720 may be considered as a receiving module. Alternatively, the transceiver module 720 may include two functional modules. The transceiver module 720 may be considered as a general term of the two functional modules. The two functional modules are a sending module and a receiving module. The sending module is configured to complete a sending operation. For example, the sending module may be configured to perform all sending operations performed by the network device in the embodiment shown in FIG. 3 or the embodiment shown in FIG. 4. The receiving module is configured to complete a receiving operation. For example, the receiving module may be configured to perform all receiving operations performed by the network device in the embodiment shown in FIG. 3 or the embodiment shown in FIG. 4.

The transceiver module 720 is configured to receive a first sequence carried on a plurality of subcarriers.

The processing module 710 is configured to differentiate the first sequence based on L granularities, to obtain a first differential sequence set including L sequences, where L is a positive integer.

The processing module 710 is further configured to obtain a differential sequence cross correlation value set corresponding to each candidate frequency domain root sequence in U candidate frequency domain root sequences, based on the first differential sequence set, where in a differential sequence cross correlation value set corresponding to a $u^{th}$ candidate frequency domain root sequence in the U candidate frequency domain root sequences, an $l^{th}$ first cross correlation value is a first cross correlation value between an $l^{th}$ sequence in the first differential sequence set and an $l^{th}$ sequence in a second differential sequence set corresponding to the $u^{th}$ candidate frequency domain root sequence, l=1, 2, ..., L, the second differential sequence set corresponding to the $u^{th}$ candidate frequency domain root sequence is a sequence set obtained by differentiating the $u^{th}$ candidate frequency domain root sequence based on the L granularities, a differentiation granularity corresponding to the $l^{th}$ sequence in the first differential sequence set is the same as that corresponding to the $l^{th}$ sequence in the second differential sequence set corresponding to the $u^{th}$ candidate frequency domain root sequence, u=1, 2, ..., U, and U is a positive integer.

The processing module 710 is further configured to determine K candidate frequency domain root sequences in the U candidate frequency domain root sequences based on differential sequence cross correlation value sets corresponding to the U candidate frequency domain root sequences, where K is an integer less than U.

The processing module 710 is further configured to determine a candidate frequency domain root sequence and a time domain cyclic shift value that correspond to the first sequence, based on the first sequence and the K candidate frequency domain root sequences.

In an optional implementation, the $u^{th}$ candidate root sequence is a ZC sequence, a truncated sequence of the ZC sequence, or a cyclic extended sequence of the ZC sequence, or the $u^{th}$ candidate frequency domain root sequence satisfies the following relationship:

$$S_u(n) = \alpha e^{-j2\pi\left(\frac{u_1 \times ((n \bmod P) - u_2)^3 + \beta n}{P} + \varphi\right)};$$

where n=0, 1, 2, ..., N−1, N represents a length of the $u^{th}$ frequency domain root sequence, $S_u(n)$ represents an $n^{th}$ element of the $u^{th}$ frequency domain root sequence, a is a non-zero complex number, φ is a real number, β is a real number, j represents an imaginary number symbol in a complex number, mod represents a modulo operation, $u_1$ and $u_2$ represent root indexes of the $u^{th}$ frequency domain root sequence, a value range of $u_1$ is positive integers less than or equal to P−1, a value range of $u_2$ is natural numbers less than or equal to P−1, and P is a prime number.

In an optional implementation, the $l^{th}$ sequence in the first differential sequence set satisfies the following relationship:

$$d_l(n) = r(n) \times r((n+l) \bmod N)^*;$$

where n=0, 1, 2, ..., N−1, or n=0, 1, 2 ..... N−1−l, $d_l(n)$ represents an $n^{th}$ element of the $l^{th}$ sequence in the first differential sequence, or represents a conjugate of the $n^{th}$ element of the $l^{th}$ sequence in the first differential sequence, r(n) represents an $n^{th}$ element of the first sequence, l represents a differentiation granularity, l∈ {1, 2, ..., L}, and mod represents a modulo operation.

In an optional implementation, the $l^{th}$ sequence in the second differential sequence set corresponding to the $u^{th}$ candidate frequency domain root sequence satisfies the following relationship:

$$c_{u,l}(n) = S_u(n) \times S_u((n+l) \bmod N)^*;$$

where n=0, 1, 2, ..., N−1, or n=0, 1, 2, ..., N−1−l, $c_{u,l}(n)$ represents an $n^{th}$ element of the $l^{th}$ sequence in the second differential sequence set corresponding to the $u^{th}$ candidate frequency domain root sequence, or represents a conjugate of the $n^{th}$ element of the $l^{th}$ sequence in the second differential sequence set corresponding to the $u^{th}$ candidate frequency domain root sequence, $S_u(n)$ represents an $n^{th}$ element of the $u^{th}$ candidate frequency domain root sequence, u∈ {1, 2, ..., U}, l represents a differentiation granularity, l∈ {1, 2, ..., L}, and mod represents a modulo operation.

In an optional implementation, the processing module 710 is configured to determine the K candidate frequency domain root sequences in the U candidate frequency domain root sequences based on the differential sequence cross correlation value sets corresponding to the U candidate frequency domain root sequences in the following manner:

obtaining a cross correlation coefficient corresponding to each candidate frequency domain root sequence, based on the differential sequence cross correlation value set corresponding to each candidate frequency domain root sequence in the U candidate frequency domain root sequences; and determining the K candidate frequency domain root sequences in the U candidate frequency domain root sequences based on U cross correlation coefficients.

In an optional implementation, a cross correlation coefficient corresponding to the $u^{th}$ candidate frequency domain root sequence is a sum of L first cross correlation values in the differential sequence cross correlation value set corresponding to the $u^{th}$ candidate frequency domain root sequence;

a cross correlation coefficient corresponding to the $u^{th}$ candidate frequency domain root sequence is an average value of first cross correlation values in the differential sequence cross correlation value set corresponding to the $u^{th}$ candidate frequency domain root sequence; or a cross correlation coefficient corresponding to the $u^{th}$ candidate frequency domain root sequence is a largest value of first cross correlation values in the differential sequence cross correlation value set corresponding to the $u^{th}$ candidate frequency domain root sequence.

In an optional implementation,

K cross correlation coefficients corresponding to the K candidate frequency domain root sequences are greater than U–K cross correlation coefficients corresponding to U–K candidate frequency domain root sequences; or K cross correlation coefficients corresponding to the K candidate frequency domain root sequences are greater than a first threshold.

In an optional implementation, the processing module 710 is configured to determine the candidate frequency domain root sequence and the time domain cyclic shift value that correspond to the first sequence, based on the first sequence and the K candidate frequency domain root sequences in the following manner:

obtaining a second cross correlation value between the first sequence and a time domain cyclic shift sequence that corresponds to each candidate frequency domain root sequence in the K candidate frequency domain root sequences; and determining the candidate frequency domain root sequence and the time domain cyclic shift value that correspond to the first sequence, based on the second cross correlation value.

Figure 8:
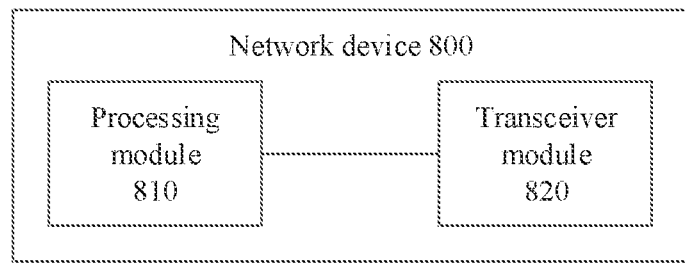
FIG. 8 is a schematic block diagram of a second network device according to an embodiment of this application.

FIG. 8 is a schematic block diagram of a communications apparatus 800 according to an embodiment of this application. For example, the communications apparatus 800 is a network device 800.

The network device 800 includes a processing module 810 and a transceiver module 820. For example, the network device 800 may be a network device, or may be a chip used in the network device or another combined device, component, or the like that has a function of the foregoing network device. When the network device 800 is a network device, the transceiver module 820 may be a transceiver. The transceiver may include an antenna, a radio frequency circuit, and the like. The processing module 810 may be a processor. The processor may include one or more CPUs. When the network device 800 is a component that has a function of the foregoing network device, the transceiver module 820 may be a radio frequency unit, and the processing module 810 may be a processor. When the network device 800 is a chip system, the transceiver module 820 may be an input/output interface of the chip, and the processing module 810 may be a processor of the chip system, and may include one or more central processing units.

For example, the processing module 810 may be configured to perform all operations except receiving and sending operations performed by the network device in the embodiment shown in FIG. 5, for example, S52 to S56, and/or configured to support another process of the technology described in this specification. The transceiver module 820 may be configured to perform all sending operations performed by the network device in the embodiment shown in FIG. 5, for example, S51, and/or configured to support another process of the technology described in this specification.

For another example, the processing module 810 may be configured to perform all operations except receiving and sending operations performed by the network device in the embodiment shown in FIG. 6, for example, S62 to S66, and/or configured to support another process of the technology described in this specification. The transceiver module 820 may be configured to perform all sending operations performed by the network device in the embodiment shown in FIG. 6, for example, S61, and/or configured to support another process of the technology described in this specification.

In addition, the transceiver module 820 may be a functional module, and the functional module can complete both a sending operation and a receiving operation. For example, the transceiver module 820 may be configured to perform all sending operations and receiving operations performed by the network device in the embodiment shown in FIG. 5 or the embodiment shown in FIG. 6. For example, when performing the sending operation, the transceiver module 820 may be considered as a sending module, and when performing the receiving operation, the transceiver module 820 may be considered as a receiving module. Alternatively, the transceiver module 820 may include two functional modules. The transceiver module 820 may be considered as a general term of the two functional modules. The two functional modules are a sending module and a receiving module. The sending module is configured to complete a sending operation. For example, the sending module may be configured to perform all sending operations performed by the network device in the embodiment shown in FIG. 5 or the embodiment shown in FIG. 6. The receiving module is configured to complete a receiving operation. For example, the receiving module may be configured to perform all receiving operations performed by the network device in the embodiment shown in FIG. 5 or the embodiment shown in FIG. 6.

The transceiver module 820 is configured to receive a first sequence carried on a plurality of subcarriers.

The processing module 810 is configured to convert the first sequence from frequency domain to time domain, to obtain a second sequence.

The processing module 810 is further configured to differentiate the second sequence based on L granularities, to obtain a first differential sequence set including L sequences, where L is a positive integer.

The processing module 810 is further configured to obtain a differential sequence cross correlation value set corresponding to each basic time domain sequence in U basic time domain sequences, based on the first differential sequence set, where in a differential sequence cross correlation value set corresponding to a $u^{th}$ basic time domain sequence in the U basic time domain sequences, an $l^{th}$ first cross correlation value is a first cross correlation value between an $l^{th}$ sequence in the first differential sequence set and an $l^{th}$ sequence in a second differential sequence set corresponding to the $u^{th}$ basic time domain sequence, l=1, 2, ..., L, the second differential sequence set corresponding to the $u^{th}$ basic time domain sequence is a sequence set obtained by differentiating the $u^{th}$ basic time domain sequence based on the L granularities, a differentiation granularity corresponding to the $l^{th}$ sequence in the first differential sequence set is the same as that corresponding to the P sequence in the second differential sequence set corresponding to the $u^{th}$ basic time domain sequence, u=1, 2, ..., U. and U is a positive integer.

The processing module 810 is further configured to determine K basic time domain sequences in the U basic time domain sequences based on differential sequence cross correlation value sets corresponding to the U basic time domain sequences, where K is an integer less than U.

The processing module 810 is further configured to determine a basic time domain sequence and a frequency domain cyclic shift value that correspond to the second sequence, based on the second sequence and the K basic time domain sequences.

In an optional implementation, the $u^{th}$ basic time domain sequence satisfies the following relationship:

$$x_u(n) = \alpha e^{j2\pi\left(\frac{u_1((n+m) \bmod P)^3}{P} + \varphi\right)}$$

where n=0, 1, 2, ..., N−1, N represents a length of the $u^{th}$ basic time domain sequence, $x_u(n)$ represents an $n^{th}$ element of the $u^{th}$ basic time domain sequence, α is a non-zero complex number, φ is a real number, j represents an imaginary number symbol in a complex number, mod represents a modulo operation, $u_1$ represents an index of the basic time domain sequence, a value range of $u_1$ is positive integers less than or equal to P−1, m represents a time domain cyclic shift value of the basic time domain sequence, a value range of m is natural numbers less than or equal to P−1, and P is a prime number.

In an optional implementation, the $l^{th}$ sequence in the first differential sequence set satisfies the following relationship:

$$f_l(n)=t(n)\times t((n+l) \bmod N)^*;$$

where n=0, 1, 2, ..., N−1, or n=0, 1, 2, ..., N−1−1, $f_l(n)$ represents an $n^{th}$ element of the $l^{th}$ sequence in the first differential sequence set, or represents a conjugate of the $n^{th}$ element of the $l^{th}$ sequence in the first differential sequence set, t(n) represents an $n^{th}$ element of the second sequence, l represents a differentiation granularity, l∈{1, 2, ..., L}, and mod represents a modulo operation.

In an optional implementation, the $l^{th}$ sequence in the second differential sequence set corresponding to the $u^{th}$ basic time domain sequence satisfies the following relationship:

$$g_{u,l}(n)=x_u(n)\times x_u((n+l) \bmod N)^*;$$

where n=0, 1, 2, ..., N−1, or n=0, 1, 2, ..., N−1−1, $g_{u,l}(n)$ represents an $n^{th}$ element of the $l^{th}$ sequence in the second differential sequence set corresponding to the $u^{th}$ basic time domain sequence, or represents a conjugate of the $n^{th}$ element of the $l^{th}$ sequence in the second differential sequence set corresponding to the $u^{th}$ basic time domain sequence, $x_u(n)$ represents an $n^{th}$ element of the $u^{th}$ basic time domain sequence, u∈{1, 2, ..., U}, l represents a differentiation granularity, l∈{1, 2, ..., L}, and mod represents a modulo operation.

In an optional implementation, the processing module 810 is configured to determine the K basic time domain sequences in the U basic time domain sequences based on differential sequence cross correlation value sets corresponding to the U basic time domain sequences in the following manner:
    obtaining a cross correlation coefficient corresponding to each basic time domain sequence, based on the differential sequence cross correlation value set corresponding to each basic time domain sequence in the U basic time domain sequences; and
    determining the K basic time domain sequences in the U basic time domain sequences based on U cross correlation coefficients.

In an optional implementation,
    a cross correlation coefficient corresponding to the $u^{th}$ basic time domain sequence is a sum of L first cross correlation values in the differential sequence cross correlation value set corresponding to the $u^{th}$ basic time domain sequence;
    a cross correlation coefficient corresponding to the $u^{th}$ basic time domain sequence is an average value of L cross correlation values in the differential sequence cross correlation value set corresponding to the $u^{th}$ basic time domain sequence; or
    a cross correlation coefficient corresponding to the $u^{th}$ basic time domain sequence is a largest value of L cross correlation values in the differential sequence cross correlation value set corresponding to the $u^{th}$ basic time domain sequence.

In an optional implementation,
    K cross correlation coefficients corresponding to the K basic time domain sequences are greater than U−K cross correlation coefficients corresponding to U−K basic time domain sequences; or
    K cross correlation coefficients corresponding to the K basic time domain sequences are greater than a first threshold.

In an optional implementation, the processing module 810 is configured to determine the basic time domain sequence and the frequency domain cyclic shift value that correspond to the second sequence, based on the second sequence and the K basic time domain sequences in the following manner:
    obtaining a second cross correlation value between the second sequence and a frequency domain cyclic shift sequence that corresponds to each basic time domain sequence in the K basic time domain sequences; and
    determining the basic time domain sequence and the frequency domain cyclic shift value that correspond to the second sequence, based on the second cross correlation value.

Figure 9:
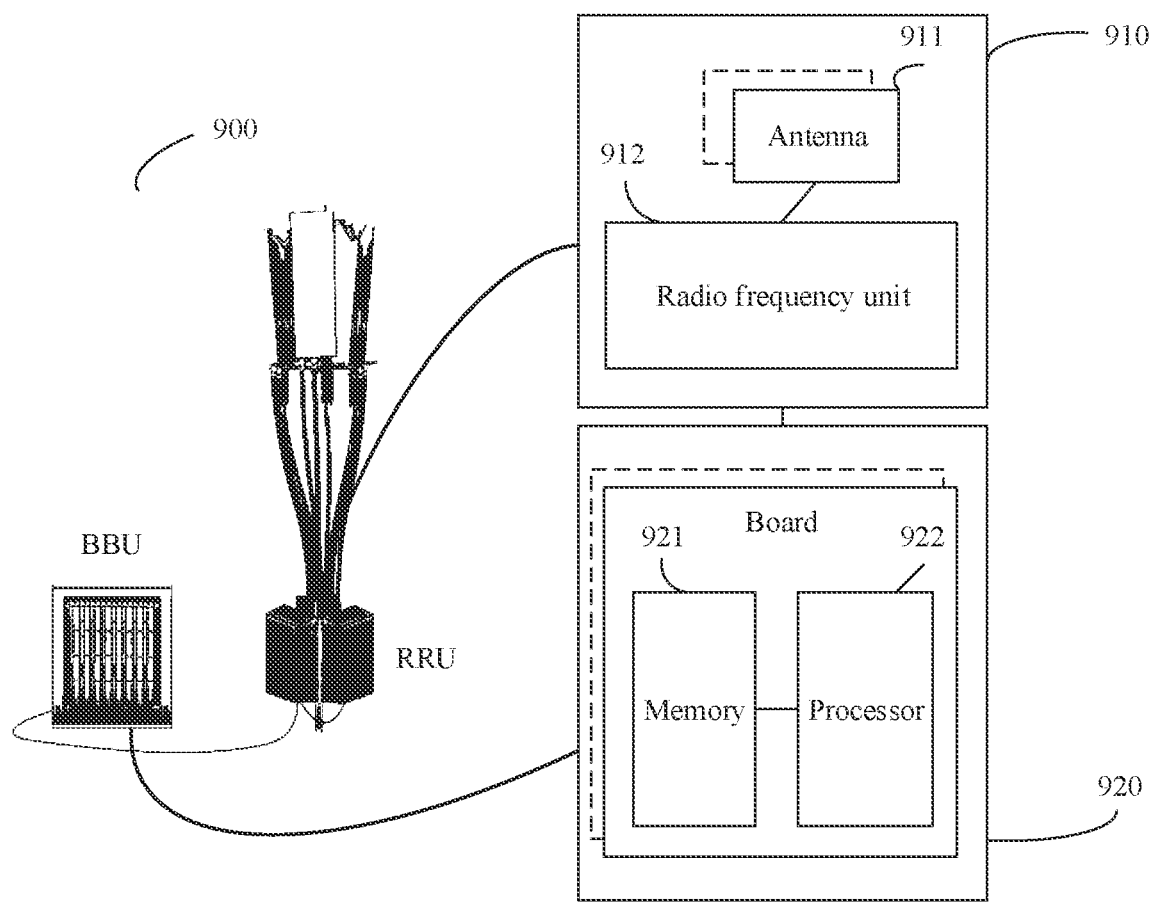
FIG. 9 is a schematic block diagram of a communications apparatus according to an embodiment of this application.

When the apparatus in embodiments of this application is a network device, the apparatus may be shown in FIG. 9. An apparatus 900 includes one or more radio frequency units, such as a remote radio unit (remote radio unit, RRU) 910 and one or more baseband units (baseband units, BBUs) (which may also be referred to as a digital unit (digital unit, DU)) 920. The RRU 910 may be referred to as a transceiver module. The transceiver module may correspond to the transceiver module 720 in FIG. 7, or the transceiver module may correspond to the transceiver module 820 in FIG. 8. Optionally, the transceiver module may also be referred to as a transceiver machine, a transceiver circuit, a transceiver, or the like, and may include at least one antenna 911 and a radio frequency unit 912. The RRU 910 is mainly configured to:

receive and send a radio frequency signal, and perform conversion between a radio frequency signal and a baseband signal. For example, the RRU 910 is configured to send indication information to a terminal device. The BBU 920 is mainly configured to: perform baseband processing, control a base station, and the like. The RRU 910 and the BBU 920 may be physically disposed together, or may be physically disposed separately, that is, a distributed base station.

The BBU 920 is a control center of the base station, may also be referred to as a processing module, may correspond to the processing module 710 in FIG. 7, or may correspond to the processing module 810 in FIG. 8, and is mainly configured to complete a baseband processing function, such as channel coding, multiplexing, modulation, and spectrum spreading. For example, the BBU (the processing module) may be configured to control the base station to perform an operation procedure related to the network device in the foregoing method embodiments, for example, generate the foregoing indication information.

In an example, the BBU 920 may include one or more boards, and a plurality of boards may jointly support a radio access network (for example, an LTE network) in a single access standard, or may separately support radio access networks (for example, an LTE network, a 5G network, or another network) in different access standards. The BBU 920 further includes a memory 921 and a processor 922. The memory 921 is configured to store necessary instructions and data. The processor 922 is configured to control the base station to perform necessary actions, for example, configured to control the base station to perform an operation procedure related to the network device in the foregoing method embodiments. The memory 921 and the processor 922 may serve one or more boards. In other words, a memory and a processor may be deployed on each board. Alternatively, a plurality of boards may share a same memory and a same processor. In addition, a necessary circuit may further be disposed on each board.

Embodiments of this application provide a first communications system. The first communications system may include the network device in the embodiment shown in FIG. 3 or the embodiment shown in FIG. 4. The network device is, for example, the network device 700 in FIG. 7 or the apparatus 900 in FIG. 9.

Embodiments of this application provide a second communications system. The first communications system may include the network device in the embodiment shown in FIG. 5 or the embodiment shown in FIG. 6. The network device is, for example, the network device 800 in FIG. 8 or the apparatus 900 in FIG. 9.

Embodiments of this application further provide a computer-readable storage medium. The computer-readable storage medium is configured to store a computer program. When the computer program is executed by a computer, the computer may implement a procedure related to a network device in the embodiment shown in FIG. 3 or the embodiment shown in FIG. 4 provided in the foregoing method embodiments.

Embodiments of this application further provide a computer-readable storage medium. The computer-readable storage medium is configured to store a computer program. When the computer program is executed by a computer, the computer may implement a procedure related to a network device in the embodiment shown in FIG. 5 or the embodiment shown in FIG. 6 provided in the foregoing method embodiments.

Embodiments of this application further provide a computer program product. The computer program product is configured to store a computer program. When the computer program is executed by a computer, the computer may implement a procedure related to a network device in the embodiment shown in FIG. 3 or the embodiment shown in FIG. 4 provided in the foregoing method embodiments.

Embodiments of this application further provide a computer program product. The computer program product is configured to store a computer program. When the computer program is executed by a computer, the computer may implement a procedure related to a network device in the embodiment shown in FIG. 5 or the embodiment shown in FIG. 6 provided in the foregoing method embodiments.

It should be understood that the processor mentioned in embodiments of this application may be a CPU, or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that, when the processor is a general-purpose processor, a DSP, an ASIC, an FPGA or another programmable logic device, a discrete gate or transistor logic device, or a discrete hardware component, the memory (a storage module) is integrated into the processor.

It should be noted that the memory described in this specification is intended to include but not limited to these memories and any memory of another appropriate type.

It should be understood that, in embodiments of this application, sequence numbers of the foregoing processes do not mean execution sequences. The execution sequences of the processes should be determined based on functions and internal logic of the processes, and should not constitute any limitation to implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solution. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatuses, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or the units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solution in embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solution of this application essentially, or the part contributing to a conventional technology, or a part of the technical solution may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing description is merely specific implementations of this application, but is not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A sequence detection method, comprising:
receiving a first sequence carried on a plurality of subcarriers;
differentiating the first sequence based on L granularities, to obtain a first differential sequence set comprising L sequences, wherein L is a positive integer, wherein the differentiating the first sequence based on L granularities comprises the first sequence being differentiated based on a differentiation granularity l, l=1,2, . . . , L;
obtaining a differential sequence cross correlation value set corresponding to each candidate frequency domain root sequence in U candidate frequency domain root sequences, based on the first differential sequence set, wherein in a differential sequence cross correlation value set corresponding to a $u^{th}$ candidate frequency domain root sequence in the U candidate frequency domain root sequences, an $l^{th}$ first cross correlation value is a first cross correlation value between an $l^{th}$ sequence in the first differential sequence set and an $l^{th}$ sequence in a second differential sequence set corresponding to the $u^{th}$ candidate frequency domain root sequence, l=1,2, . . . , L, the second differential sequence set corresponding to the $u^{th}$ candidate frequency domain root sequence is a sequence set obtained by differentiating the $u^{th}$ candidate frequency domain root sequence based on the L granularities, a differentiation granularity corresponding to the $l^{th}$ sequence in the first differential sequence set is the same as that corresponding to the $l^{th}$ sequence in the second differential sequence set corresponding to the $u^{th}$ candidate frequency domain root sequence, u=1, 2, . . . , U, and U is a positive integer greater than 1;
determining K candidate frequency domain root sequences in the U candidate frequency domain root sequences based on differential sequence cross correlation value sets corresponding to the U candidate frequency domain root sequences, wherein K is a positive integer less than U; and
determining a candidate frequency domain root sequence and a time domain cyclic shift value that correspond to the first sequence, based on the first sequence and the K candidate frequency domain root sequences, wherein the determining a candidate frequency domain root sequence and a time domain cyclic shift value that correspond to the first sequence, based on the first sequence and the K candidate frequency domain root sequences comprises:
obtaining a second cross correlation value between the first sequence and a time domain cyclic shift sequence that corresponds to each candidate frequency domain root sequence in the K candidate frequency domain root sequences; and
determining the candidate frequency domain root sequence and the time domain cyclic shift value that correspond to the first sequence, based on the second cross correlation value.

2. The method according to claim 1, wherein the $u^{th}$ candidate root sequence is a Zadoff-Chu (ZC) sequence, a truncated sequence of the ZC sequence, or a cyclic extended sequence of the ZC sequence, or the $u^{th}$ candidate frequency domain root sequence satisfies the following relationship:

$$S_u(n) = \alpha e^{-j2\pi\left(\frac{u_1 \times ((n \bmod P) - u_2)^3 + \beta n}{P} + \varphi\right)};$$

wherein n=0, 1, 2, ..., N−1, N represents a length of the $u^{th}$ frequency domain root sequence, $S_u(n)$ represents an $n^{th}$ element of the $u^{th}$ frequency domain root sequence, α is a non-zero complex number, φ is a real number, β is a real number, j represents an imaginary number symbol in a complex number, mod represents a modulo operation, $u_1$ and $u_2$ represent root indexes of the $u^{th}$ frequency domain root sequence, a value range of $u_1$ is positive integers less than or equal to P−1, a value range of $u_2$ is natural numbers less than or equal to P−1, and P is a prime number.

3. The method according to claim 1, wherein the $l^{th}$ sequence in the first differential sequence set satisfies the following relationship:

$$d_l(n)=r(n)\times r((n+l)\bmod N)^*;$$

wherein n=0, 1, 2, ..., N−1, or n=0, 1, 2, ..., N−1−l, $d_l(n)$ represents an $n^{th}$ element of the $n^{th}$ sequence in the first differential sequence, or represents a conjugate of the $n^{th}$ element, r(n) represents an $n^{th}$ element of the first sequence, l represents a differentiation granularity, l∈{1,2, ..., L}, and mod represents a modulo operation.

4. The method according to claim 1, wherein the $l^{th}$ sequence in the second differential sequence set corresponding to the $u^{th}$ candidate frequency domain root sequence satisfies the following relationship:

$$c_{u,l}(n)=S_u(n)\times S_u((n+l)\bmod N)^*;$$

wherein n=0, 1, 2, ..., N−1, or n=0, 1, 2, ..., N−1−l, $c_{u,l}(n)$ represents an $n^{th}$ element of the $l^{th}$ sequence in the second differential sequence set corresponding to the $u^{th}$ candidate frequency domain root sequence, or represents a conjugate of the $n^{th}$ element, $S_u(n)$ represents an $n^{th}$ element of the $u^{th}$ candidate frequency domain root sequence, u∈{1,2, ..., U}, l represents a differentiation granularity, l∈{1,2, ..., L}, and mod represents a modulo operation.

5. The method according to claim 1, wherein the determining K candidate frequency domain root sequences in the U candidate frequency domain root sequences based on differential sequence cross correlation value sets corresponding to the U candidate frequency domain root sequences comprises:
    obtaining a cross correlation coefficient corresponding to each candidate frequency domain root sequence, based on the differential sequence cross correlation value set corresponding to each candidate frequency domain root sequence in the U candidate frequency domain root sequences; and
    determining the K candidate frequency domain root sequences in the U candidate frequency domain root sequences based on U cross correlation coefficients.

6. The method according to claim 5, wherein
a cross correlation coefficient corresponding to the $u^{th}$ candidate frequency domain root sequence is a sum of L first cross correlation values in the differential sequence cross correlation value set corresponding to the $u^{th}$ candidate frequency domain root sequence;
a cross correlation coefficient corresponding to the $u^{th}$ candidate frequency domain root sequence is an average value of first cross correlation values in the differential sequence cross correlation value set corresponding to the $u^{th}$ candidate frequency domain root sequence; or
a cross correlation coefficient corresponding to the $u^{th}$ candidate frequency domain root sequence is a largest value of first cross correlation values in the differential sequence cross correlation value set corresponding to the $u^{th}$ candidate frequency domain root sequence.

7. The method according to claim 5, wherein
K cross correlation coefficients corresponding to the K candidate frequency domain root sequences are greater than U−K cross correlation coefficients corresponding to U−K candidate frequency domain root sequences; or
K cross correlation coefficients corresponding to the K candidate frequency domain root sequences are greater than a first threshold.

8. A communications apparatus, comprising one or more processors, and a memory configure to store program instructions; wherein, when executed by the one or more processors, the instructions cause the communications apparatus to: receive a first sequence carried on a plurality of subcarriers; and differentiate the first sequence based on L granularities, to obtain a first differential sequence set comprising L sequences, wherein L is a positive integer, wherein the differentiating the first sequence based on L granularities comprises the first sequence being differentiated based on a differentiation granularity l, l=1,2, ..., L;
    and obtain a differential sequence cross correlation value set corresponding to each candidate frequency domain root sequence in U candidate frequency domain root sequences, based on the first differential sequence set, wherein in a differential sequence cross correlation value set corresponding to a $u^{th}$ candidate frequency domain root sequence in the U candidate frequency domain root sequences, an $l^{th}$ first cross correlation value is a first cross correlation value between an $l^{th}$ sequence in the first differential sequence set and an $l^{th}$ sequence in a second differential sequence set corresponding to the $u^{th}$ candidate frequency domain root sequence, l=1, 2, ..., L, the second differential sequence set corresponding to the $u^{th}$ candidate frequency domain root sequence is a sequence set obtained by differentiating the $u^{th}$ candidate frequency domain root sequence based on the L granularities, a differentiation granularity corresponding to the $l^{th}$ sequence in the first differential sequence set is the same as that corresponding to the $l^{th}$ sequence in the second differential sequence set corresponding to the $u^{th}$ candidate frequency domain root sequence, u=1, 2, ..., U, and U is a positive integer greater than 1;
    determine K candidate frequency domain root sequences in the U candidate frequency domain root sequences based on differential sequence cross correlation value sets corresponding to the U candidate frequency domain root sequences, wherein K is a positive integer less than U;
    and determine a candidate frequency domain root sequence and a time domain cyclic shift value that correspond to the first sequence, based on the first sequence and the K candidate frequency domain root sequences, wherein the instructions cause the communications apparatus to determine the candidate frequency domain root sequence and the time domain cyclic shift value that correspond to the first sequence, based on the first sequence and the K candidate frequency domain root sequences in the following manner:
    obtaining a second cross correlation value between the first sequence and a time domain cyclic shift sequence that corresponds to each candidate frequency domain root sequence in the K candidate frequency domain root sequences;

and determining the candidate frequency domain root sequence and the time domain cyclic shift value that correspond to the first sequence, based on the second cross correlation value.

9. The communications apparatus according to claim 8, wherein the $u^{th}$ candidate root sequence is a Zadoff-Chu (ZC) sequence, a truncated sequence of the ZC sequence, or a cyclic extended sequence of the ZC sequence, or the $u^{th}$ candidate frequency domain root sequence satisfies the following relationship:

$$S_u(n) = \alpha e^{-j2\pi\left(\frac{u_1 \times ((n \bmod P) - u_2)^3 + \beta n}{P} + \varphi\right)};$$

wherein n=0, 1, 2, ..., N−1, N represents a length of the $u^{th}$ frequency domain root sequence, $S_u(n)$ represents an $n^{th}$ element of the $u^{th}$ frequency domain root sequence, α is a non-zero complex number, φ is a real number, β is a real number, j represents an imaginary number symbol in a complex number, mod represents a modulo operation, $u_1$ and $u_2$ represent root indexes of the $u^{th}$ frequency domain root sequence, a value range of $u_1$ is positive integers less than or equal to P−1, a value range of $u_2$ is natural numbers less than or equal to P−1, and P is a prime number.

10. The communications apparatus according to claim 8, wherein the $l^{th}$ sequence in the first differential sequence set satisfies the following relationship:

$$d_l(n) = r(n) \times r((n+l) \bmod N)^*;$$

wherein n=0, 1, 2, ..., N−1, or n=0, 1, 2, ..., N−1−l, $d_l(n)$ represents an $n^{th}$ element of the $l^{th}$ sequence in the first differential sequence, or represents a conjugate of the $n^{th}$ element, r(n) represents an $n^{th}$ element of the first sequence, l represents a differentiation granularity, l∈{1,2, ..., L}, and mod represents a modulo operation.

11. The communications apparatus according to claim 8, wherein the $l^{th}$ sequence in the second differential sequence set corresponding to the $u^{th}$ candidate frequency domain root sequence satisfies the following relationship:

$$c_{u,l}(n) = S_u(n) \times S_u((n+l) \bmod N)^*;$$

wherein n=0, 1, 2, ..., N−1, or n=0, 1, 2, ..., N−1−l, $c_{u,l}(n)$ represents an $n^{th}$ element of the $l^{th}$ sequence in the second differential sequence set corresponding to the $u^{th}$ candidate frequency domain root sequence, or represents a conjugate of the $n^{th}$ element, $S_u(n)$ represents an $n^{th}$ element of the $u^{th}$ candidate frequency domain root sequence, u∈{1,2, ..., U}, l represents a differentiation granularity, l∈{1,2, ..., L}, and mod represents a modulo operation.

12. The communications apparatus according to claim 8, wherein the instructions cause the communications apparatus to determine the K candidate frequency domain root sequences in the U candidate frequency domain root sequences based on the differential sequence cross correlation value sets corresponding to the U candidate frequency domain root sequences in the following manner:
obtaining a cross correlation coefficient corresponding to each candidate frequency domain root sequence, based on the differential sequence cross correlation value set corresponding to each candidate frequency domain root sequence in the U candidate frequency domain root sequences; and
determining the K candidate frequency domain root sequences in the U candidate frequency domain root sequences based on U cross correlation coefficients.

13. The communications apparatus according to claim 12, wherein a cross correlation coefficient corresponding to the $u^{th}$ candidate frequency domain root sequence is a sum of L first cross correlation values in the differential sequence cross correlation value set corresponding to the $u^{th}$ candidate frequency domain root sequence;
a cross correlation coefficient corresponding to the $u^{th}$ candidate frequency domain root sequence is an average value of first cross correlation values in the differential sequence cross correlation value set corresponding to the $u^{th}$ candidate frequency domain root sequence; or
a cross correlation coefficient corresponding to the $u^{th}$ candidate frequency domain root sequence is a largest value of first cross correlation values in the differential sequence cross correlation value set corresponding to the $u^{th}$ candidate frequency domain root sequence.

14. The communications apparatus according to claim 12, wherein K cross correlation coefficients corresponding to the K candidate frequency domain root sequences are greater than U−K cross correlation coefficients corresponding to U−K candidate frequency domain root sequences; or
K cross correlation coefficients corresponding to the K candidate frequency domain root sequences are greater than a first threshold.

15. One or more non-transitory computer-readable media storing computer instructions, that when executed by one or more processors, cause a computing device to perform operations comprising: receiving a first sequence carried on a plurality of subcarriers; differentiating the first sequence based on L granularities, to obtain a first differential sequence set comprising L sequences, wherein L is a positive integer, wherein the differentiating the first sequence based on L granularities comprises the first sequence being differentiated based on a differentiation granularity l, l=1, 2, ..., L;
obtaining a differential sequence cross correlation value set corresponding to each candidate frequency domain root sequence in U candidate frequency domain root sequences, based on the first differential sequence set, wherein in a differential sequence cross correlation value set corresponding to a $u^{th}$ candidate frequency domain root sequence in the U candidate frequency domain root sequences, an $l^{th}$ first cross correlation value is a first cross correlation value between an $l^{th}$ sequence in the first differential sequence set and an $l^{th}$ sequence in a second differential sequence set corresponding to the $u^{th}$ candidate frequency domain root sequence, l=1, 2, ..., L, the second differential sequence set corresponding to the $u^{th}$ candidate frequency domain root sequence is a sequence set obtained by differentiating the $u^{th}$ candidate frequency domain root sequence based on the L granularities, a differentiation granularity corresponding to the $l^{th}$ sequence in the first differential sequence set is the same as that corresponding to the $l^{th}$ sequence in the second differential sequence set corresponding to the $u^{th}$ candidate frequency domain root sequence, u=1, 2, ..., U, and U is a positive integer greater than 1;
determining K candidate frequency domain root sequences in the U candidate frequency domain root sequences based on differential sequence cross correlation value sets corresponding to the U candidate frequency domain root sequences, wherein K is a positive integer less than U;

and determining a candidate frequency domain root sequence and a time domain cyclic shift value that correspond to the first sequence, based on the first sequence and the K candidate frequency domain root sequences, wherein the determining a candidate frequency domain root sequence and a time domain cyclic shift value that correspond to the first sequence, based on the first sequence and the K candidate frequency domain root sequences comprises:

obtaining a second cross correlation value between the first sequence and a time domain cyclic shift sequence that corresponds to each candidate frequency domain root sequence in the K candidate frequency domain root sequences; and determining the candidate frequency domain root sequence and the time domain cyclic shift value that correspond to the first sequence, based on the second cross correlation value.

16. The one or more non-transitory computer-readable media according to claim 15, wherein the $u^{th}$ candidate root sequence is a Zadoff-Chu (ZC) sequence, a truncated sequence of the ZC sequence, or a cyclic extended sequence of the ZC sequence, or the $u^{th}$ candidate frequency domain root sequence satisfies the following relationship:

$$S_u(n) = \alpha e^{-j2\pi\left(\frac{u_1 \times ((n \bmod P) - u_2)^3 + \beta n}{P} + \varphi\right)};$$

wherein n=0, 1, 2, . . . , N−1, N represents a length of the $u^{th}$ frequency domain root sequence, $S_u(n)$ represents an $n^{th}$ element of the $u^{th}$ frequency domain root sequence, α is a non-zero complex number, φ is a real number, β is a real number, j represents an imaginary number symbol in a complex number, mod represents a modulo operation, $u_1$ and $u_2$ represent root indexes of the $u^{th}$ frequency domain root sequence, a value range of $u_1$ is positive integers less than or equal to P−1, a value range of $u_2$ is natural numbers less than or equal to P−1, and P is a prime number.

17. The one or more non-transitory computer-readable media according to claim 15, wherein the $l^{th}$ sequence in the first differential sequence set satisfies the following relationship:

$$d_l(n) = r(n) \times r((n+l) \bmod N)^*;$$

wherein n=0, 1, 2, . . . , N−1, or n=0, 1, 2, . . . , N−1−l, $d_l(n)$ represents an $n^{th}$ element of the $l^{th}$ sequence in the first differential sequence, or represents a conjugate of the $n^{th}$ element, r(n) represents an $n^{th}$ element of the first sequence, l represents a differentiation granularity, l∈{1,2, . . . , L}, and mod represents a modulo operation.

18. The one or more non-transitory computer-readable media according to claim 15, wherein the $l^{th}$ sequence in the second differential sequence set corresponding to the $u^{th}$ candidate frequency domain root sequence satisfies the following relationship:

$$c_{u,l}(n) = S_u(n) \times S_u((n+l) \bmod N)^*;$$

wherein n=0, 1, 2, . . . , N−1, or n=0, 1, 2, . . . , N−1−l, $c_{u,l}(n)$ represents an $n^{th}$ element of the $l^{th}$ sequence in the second differential sequence set corresponding to the $u^{th}$ candidate frequency domain root sequence, or represents a conjugate of the $n^{th}$ element, $S_u(n)$ represents an $n^{th}$ element of the $u^{th}$ candidate frequency domain root sequence, u∈{1,2, . . . , U}, l represents a differentiation granularity, l∈{1,2, . . . , L}, and mod represents a modulo operation.

* * * * *

UNITED STATES PATENT AND TRADEMARK OFFICE
CERTIFICATE OF CORRECTION

PATENT NO. : 12,016,058 B2
APPLICATION NO. : 17/831683
DATED : June 18, 2024
INVENTOR(S) : Mingxin Gong and Bingyu Qu It is certified that error appears in the above-identified patent and that said Letters Patent is hereby corrected as shown below:

In the Claims

In Column 61, In Line 18, In Claim 3, delete "$n^{th}$" and insert -- $I^{th}$ --.

In Column 62, In Line 35, In Claim 8, delete "1=1, 2, . . . , L," and insert -- I=1, 2, . . . , L, --.

In Column 64, In Line 53, In Claim 15, delete "1=1, 2, . . . , L," and insert -- I=1, 2, . . . , L, --.

Signed and Sealed this
Twenty-ninth Day of October, 2024

Katherine Kelly Vidal
*Director of the United States Patent and Trademark Office*